(12) United States Patent
Pollard et al.

(10) Patent No.: US 6,249,360 B1
(45) Date of Patent: Jun. 19, 2001

(54) IMAGE SCANNING DEVICE AND METHOD

(75) Inventors: Stephen Bernard Pollard, Dursley; Richard Oliver Kahn, Bristol, both of (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/042,987

(22) Filed: Mar. 17, 1998

(30) Foreign Application Priority Data

Apr. 14, 1997 (EP) .................................................. 97302519

(51) Int. Cl.⁷ .............................. H04N 1/024; H04N 1/04
(52) U.S. Cl. ............................................ 358/473; 358/488
(58) Field of Search .................................... 358/473, 474, 358/401, 450, 540, 505, 513; 382/312, 313; 250/557, 208.1; 701/207

(56) References Cited

U.S. PATENT DOCUMENTS

| | | | |
|---|---|---|---|
| 4,272,756 | 6/1981 | Kakumoto et al. | 382/284 |
| 4,797,544 | 1/1989 | Montgomery et al. | 358/473 |
| 4,901,163 | 2/1990 | Tsujioka et al. | 358/473 |
| 5,140,647 | 8/1992 | Ise et al. | 382/284 |
| 5,306,908 | 4/1994 | McConica et al. | 358/473 |
| 5,355,146 | 10/1994 | Chiu et al. | 358/473 |
| 5,578,813 | 11/1996 | Allen et al. | 250/208.1 |
| 5,611,033 | 3/1997 | Pitteloud et al. | 345/435 |
| 5,644,139 * | 7/1997 | Allen et al. | 250/557 |
| 5,675,672 | 10/1997 | Nakabayashi | 382/318 |
| 5,686,960 | 11/1997 | Sussman et al. | 382/284 |
| 5,729,008 | 3/1998 | Blalock et al. | 250/208.1 |
| 5,787,889 * | 8/1998 | Edwards et al. | 600/443 |
| 5,825,044 * | 10/1998 | Allen et al. | 250/557 |
| 5,930,411 * | 7/1999 | Kojima et al. | 382/312 |

FOREIGN PATENT DOCUMENTS

| | | |
|---|---|---|
| 3823622 | 1/1989 | (DE) . |
| 2586497 | 2/1989 | (EP) . |
| 0388282 | 9/1990 | (EP) . |
| 0651552 | 5/1995 | (EP) . |
| 0698991 | 2/1996 | (EP) . |
| 0730366 | 9/1996 | (EP) . |
| 2288512 | 10/1995 | (GB) . |
| 90/05962 | 5/1990 | (WO) . |
| 93/12501 | 6/1993 | (WO) . |
| 96/27257 | 9/1996 | (WO) . |

OTHER PUBLICATIONS

Wolberg, *Digital Image Warping,* IEEE Computer Society Press Monograph, pp. ii–iv, 117–161, 187–204 (1964).
Baird, "The Skew Angle of Printed Documents," *SPSE Symposium on Hybrid Imaging Systems,* pp. 21–24 (1987).

* cited by examiner

*Primary Examiner*—Cheukfan Lee

(57) ABSTRACT

The present invention relates to a method of reconstructing an image from data captured by a sensor, and is particularly applicable to the case of sequential capture in relative movement between a scanning device and the original image. The seanning device comprises navigation means for detecting the position of the sensor relative to the original image. A pixel grid for the reconstructed image is determined, and correspondence between the pixel grid and the sensor data is identified using sensor position detection data. The intensity of pixels is determined from sensor data selected as relevant to the pixel under consideration.

21 Claims, 18 Drawing Sheets

IMAGE SCANNING DEVICE AND METHOD

TECHNICAL FIELD

The present invention relates generally to devices and methods for forming scanned or otherwise captured electronic images of originals. It is particularly relevant to devices and methods in which the image is captured in arbitrary sequence, especially in unrestrained hand scanning.

BACKGROUND ART

Scanners for electronically forming an image of an original are known. Typically, the captured image provided by a scanner is a pixel data array that is stored in memory in a digital format. A distortion-free image requires a faithful mapping of the original image to the pixel data array. Scanners typically include at least one means for imposing a mechanical constraint during the image capture process in order to maximize the likelihood of faithful mapping. The four types of scanners known in the art are drum scanners, flatbed scanners, two-dimensional array scanners and hand scanners.

Drum scanners attach the original to the surface of a cylindrical drum that rotates at a substantially fixed velocity. During the rotation of the drum, an image sensor is moved in a direction parallel to the rotational axis of the drum. The combination of the linear displacement of the image sensor and the rotation of the original on the drum allows the entire original to be scanned. At any moment during the imaging process, the current position within the pixel data array relative to the original can be determined by measuring the angular position of the drum and the translational position of the sensor. The position of the pixel data array with respect to the original is fixed as long as the original is properly attached to the drum, the drum rotation is properly controlled, and the sensor is properly controlled in its displacement along the linear path.

Flatbed scanners include a linear array sensor that is moved relative to the original along an axis that is perpendicular to the axis of the array. Thus, the position of the sensor in one dimension may be known by tracking the relative movement of the sensor. The position of the sensor in the perpendicular direction is implicitly fixed by addressing a particular array element at which intensity is to be measured. In one embodiment of the flatbed scanner, the original is placed on a transparent platen and the sensor, along with an image illumination source, is placed on a side of the platen opposite to the original. As long as the original is not moved relative to the platen, the pixel data array will be fixed with respect to the image to be captured. In another embodiment, the original is moved, rather than the sensor. This second embodiment is typical of facsimile machines. Precision paper transports provide a high degree of positional accuracy during the image-capture process.

Advantages of the drum and flatbed scanners include the ability to accommodate documents at least as large as A4, or 8.5"×11" paper. Moreover, some of these scanners can handle A1 paper in a single setup. However, the scanners are not generally portable, since they require a host computer for control, data storage and image manipulation.

Two-dimensional array scanners may be used in the absence of mechanical encoding constraints, and require only that the array and the original be held motionless during an exposure period. A two-dimensional array of photosensitive elements directly accomplishes the mapping of the image of the original into a pixel data array. However, because a single 300 dpi mapping of an 8.5"×11" original requires an image sensor having an array of 2500×3300 elements, i.e. 8.25 million pixels, these scanners are cost-prohibitive in most applications.

Conventional hand scanners require a user to move a linear array of electrooptical sensor elements over an original. The movement is by hand manipulation. Array-position information is determined using methods such as those employed in operation of a computer "mouse." As a linear sensor array is moved, the rotation of wheels, balls or rollers that are in contact with the original is sensed, and the position information is determined from the mechanical details of the rotation. In general, the surface of the mechanical element in contact with the original has a high coefficient of friction, e.g. rubber, so as to resist slip and skid. A cylindrical roller or two wheels connected by a rigid axle may be used to enforce a single translational degree of freedom during the scanning process. A straight-edge or other fixture is often used to fix the scan direction with respect to the original and to further enforce the translational constraint provided by the pair of wheels or the roller. Nevertheless, the position encoder approach is one that is often susceptible to slips and skips, so that the pixel data array loses its correspondence with the image on the original.

Hand scanners are typically connected directly to a separate computer for image data storage, processing, and use. Data rates from the image sensor tend to limit the scanning speed. The scanners provide feedback to the user, typically by means of green or red light emitting diodes, to maintain the appropriate speed for the desired image resolution. Some hand scanners use electromagnetic brakes to prevent the user from dragging the scanner over the image too rapidly, with the mechanical resistance increasing with increases in scanning speed.

Hand scanners utilize relatively small imaging arrays and generally cannot handle larger than A6 documents in a single pass. This requires stitching algorithms to join together multiple swaths of a larger document. Swath stitching may be done in a separate operation by a separate computer. Scanning a multi-page business document or report with a hand scanner is a tedious process that often yields low-quality results. Techniques for stitching image swaths are known in the scanning art. These techniques typically require a pair of complete image swaths and produce a single, global transformation which brings the two swaths into registration. Improved techniques are taught in the International Patent Application Publication No. WO 96/27257.

In forming a scanned electronic image it is necessary to acquire navigation information that is acquired along with image data. A hand scanner in which navigation information is obtained without compromise to ease of use of the scanner is described in U.S. Pat. No. 5,578,813. The navigation information is acquired by means of at least one navigation sensor that detects inherent structure-related properties of an original being scanned. Movement of an image sensor along the original is tracked by monitoring variations of the inherent structure-related properties as the image sensor is moved relative to the original. The inherent structure-related properties that are monitored are inherent structural features, such as paper fibers, or other constituents of the original. Navigation can alternatively be speckle-based, wherein movement of the image sensor along the original is tracked by monitoring variations of speckle patterns produced using coherent illumination for acquiring the navigation information.

"Inherent structure-related properties" are properties of the original that are attributable to factors that are independent of forming image data and/or of systematic registration data on the original. The navigation information may be formed by generating a position signal that is responsive to detection of inherent structure-related properties, such as a position signal of speckle information or a position signal that permits tracking of individual inherent structural features. "Inherent structural features" are those features of an original that are characteristic of processes of forming the original and are independent of forming image data and/or systematic registration data on the original. For example, if the original recorded media is a paper product, the inherent structural features of interest may be paper fibers. As another example, navigation of the image sensor across a glossy original or an overhead transparency film may be determined by tracking surface texture variations that affect specular fields. Typically, the inherent structural features are microscopic, e.g. between 10 and 40 µm, features of surface texture.

The present invention is directly applicable to hand scanners as taught in International Patent Application Publication No. WO 96/27257 and U.S. Pat. No. 5,578,813, both of which applications are incorporated herein by reference to the extent that this is permissible by national law.

As previously noted, some type of fixture is typically used with a hand scanner. In the absence of a fixture (as is the case for most embodiments in U.S. Pat. No. 5,578,813), there is a tendency to impose some rotation as the hand scanner is moved across an original. If the user's elbow is resting on a flat surface during movement of the scanner, the rotation is likely to have a radius defined by the distance between the scanner and the user's elbow. As a consequence, the scanned electronic image will be distorted. Other curvilinear movements during a swath of the scanner will also create distortions.

The present invention aims to provide a scanning device and method that produces high quality distortion free reproduction of an original even in the presence of distorted scanning paths. This allows the user greater freedom to scan a document by hand and allows the production of a composite image from the continuous scanning of overlapping parts of an original image with a high degree of correspondence between the original and the reproduced image.

SUMMARY OF THE INVENTION

According to the present invention we provide a method of reconstructing an image captured as image data in a sensor and position data in a navigation means, comprising: defining a pixel grid for all or part of the reconstructed image; using position data to identify correspondence between sensor data and the pixel grid; and determining the intensity of pixels in the pixel grid from image data obtained at a plurality of sensor positions and selected as relevant to each pixel, respectively, for which the intensity is to be determined.

This method is particularly effective when applied to reconstruction of a hand scanned image, which is received as a stream of successive sensor readings with position data for each sensor reading. Dependence on an individual sensor reading of the scanner is reduced, and data from even irregular scanning can be assembled and processed with relatively little computational effort.

Preferably, the step of identifying correspondence between image data and the pixel grid comprises mapping of image data on to the pixel grid, whereby a region is defined in the pixel grid between the image data of boundary sensor readings after mapping of the boundary sensor readings on to the pixel grid, wherein image data defining said region are selectable as relevant to pixels within said region. The boundary sensor readings may either be two consecutive readings in the stream, or may alternatively be any two sensor readings in the stream, in which case any sensor readings in the stream between the boundary sensor readings are also selectable as relevant to pixels within said region, the boundary sensor readings and all sensor readings between them in the stream comprising a chunk. The "chunkwise" approach sacrifices some accuracy for a significant reduction in computation cost.

In preferred embodiments, the step of identifying correspondence between image data and the pixel grid further comprises the step of determining which pixels in the pixel grid fall within the region defined by the selected sets of sensor data. Advantageously, pixels in the pixel grid are mapped into a space defined by the boundary sensor readings, and the grid pixels for which intensity is determined are those that map within the defined space.

In certain embodiments, the intensity of a pixel is determined by interpolation from sensor pixel values in each of two successive sensor readings, wherein the sensor pixel values are selected to span the grid pixel mapped into the space. Advantageously, said interpolation is a bilinear interpolation from two sensor pixel values in each of two successive sensor readings. In alternative embodiments, the point of intersection of a line in the pixel grid with successive sensor reading positions is determined, and wherein a sensor pixel value for the intersection point is calculated by interpolation between the sensor pixel values to either side of the insertion point, and wherein the pixel intensity values for a grid pixel along that line is calculated by interpolation between intersection point sensor values. In the case where the line in the pixel grid is a row of pixels, a particularly computationally efficient method is provided.

Advantageously, the sensor is comprised in a scanning device, especially a hand scanner. In a further aspect, the invention provides a scanning device for implementing a method as indicated above, and further provides a scanning device for collecting image data which is designed for interconnection to a computer system for performing a method as indicated above.

Navigation information may be provided in a variety of ways, as is taught in U.S. Pat. No. 5,578,813. In the broadest approach, there is no limitation to the sources of navigation information that are to be used to remove distortion artifacts of curvilinear and rotational movement of the scanning device along a scan path. The navigation signal may therefore be in the form of a position signal that is responsive to detection of image data on the original (e.g., identification of edges of text characters), with the position signal then being used in the manipulation of an image signal. A second approach is one in which a position signal is responsive to detection of inherent-structure related properties, such as the properties that determine speckle patterns. The third approach is to track navigation of the scanning device by monitoring the positions of individual inherent structural features (e.g., paper fibers) over time.

In the embodiments to be described the image sensor is a linear array of electrooptical elements, while the navigation approach utilizes at least one two-dimensional array of navigation sensor elements. By placing a separate two-dimensional navigation array at each end of the image sensor, the scanner is afforded three degrees of freedom of movement. If the original is planar, two of the degrees of freedom are translational and are perpendicular to each other within the plane of the original, while the third degree of freedom is rotational about the normal to the plane of the original. The accuracy of rotation tracking is enhanced by the use of two navigation arrays, with each array having a smaller array extent than would be necessary if only a single navigation array were used. While the described embodiment is one in which a navigation sensor is a two-dimensional array, linear arrays may also be used. Moreover, as will be described more fully below, navigation information for rectifying image data could feasibly be acquired by fixing other position-tracking means to the scanning device, including encoding wheels and balls, computer mice track balls, registration grid-detectors, accelerometers, mechanical linkages, non-contacting electromagnetic and electrostatic linkages and time-delay integration sensor arrays. In many of these alternative embodiments, navigation information for rectifying the image data is acquired in manners independent of any inherent structure-related properties of the original, since position tracking does not include image acquisition.

The navigation sensors are in a known position relative to the image sensor. Preferably, the navigation sensors are as close to the end points of the imaging sensor as possible, so that the navigation sensors are less susceptible to travelling beyond the edge of an original as the image array is moved. The image sensor forms a signal that is representative of an image of interest. Simultaneously, each navigation sensor forms a signal representative of the inherent structure-related properties of the original. The scanning device may be moved in a freehand meandering pattern, such as one of alternating left-to-right and right-to-left movements with descent along the original, with the device remaining in contact with the original. Each one of the side-to-side swaths should overlap a portion of the previous swath, so that the image may be manipulated with respect to position and stitched either during or following the scanning process. The manipulation of the image signal is a rectification of image data, with the rectification being based upon the relative movement between the navigation sensor or sensors and the inherent structure-related properties detected by the navigation sensors. The manipulation is a "rectification" of the image signal, i.e., an operation of arranging and modifying acquired image data based upon navigation data in order to achieve conformance between original and output images. The stitching is used to connect image data acquired during successive swaths.

Each navigation sensor may include one or more light sources designed to provide contrast dependent upon the inherent structure-related properties of the original. Emitted light may be in the visible range, but this is not essential. For example, "grazing" light that has large angles of incidence relative to the surface normal will interact with paper fibers at or near the surface of an original that is a paper product, creating contrast-enhancing shadows among the fibers. On the other hand, if the original has a glossy surface, such as a photographic print, a clay-coated paper or an overhead transparency film, normally incident light will produce an image in the specular field that has image-contrast features sufficient for purposes of navigation. Optical elements such as filters and one or more imaging lenses further improve detection of inherent structure-related properties.

An advantage of the described embodiments is that the scanning device and method allow three degrees of freedom of movement of the scanning device while still affording quality image capture. Thus, a portable, pocket-sized scanning device may be manufactured and used in the absence of mechanical constraints, other than that afforded by contact with the surface of the original throughout the image capture process. The invention is not limited in application to embodiments in which the scanning device is in contact with the original—with appropriate navigation information, image reconstruction will be possible from images captured in various environments. Another advantage is that because the scanning device of the described embodiments forms an electronic image based upon detection of inherent structural features, large areas of "whitespace" between image features of the original will be preserved and therefore not result in the image features being moved closer together during a stitching step.

BEST MODE FOR CARRYING OUT THE INVENTION

Figure 1:
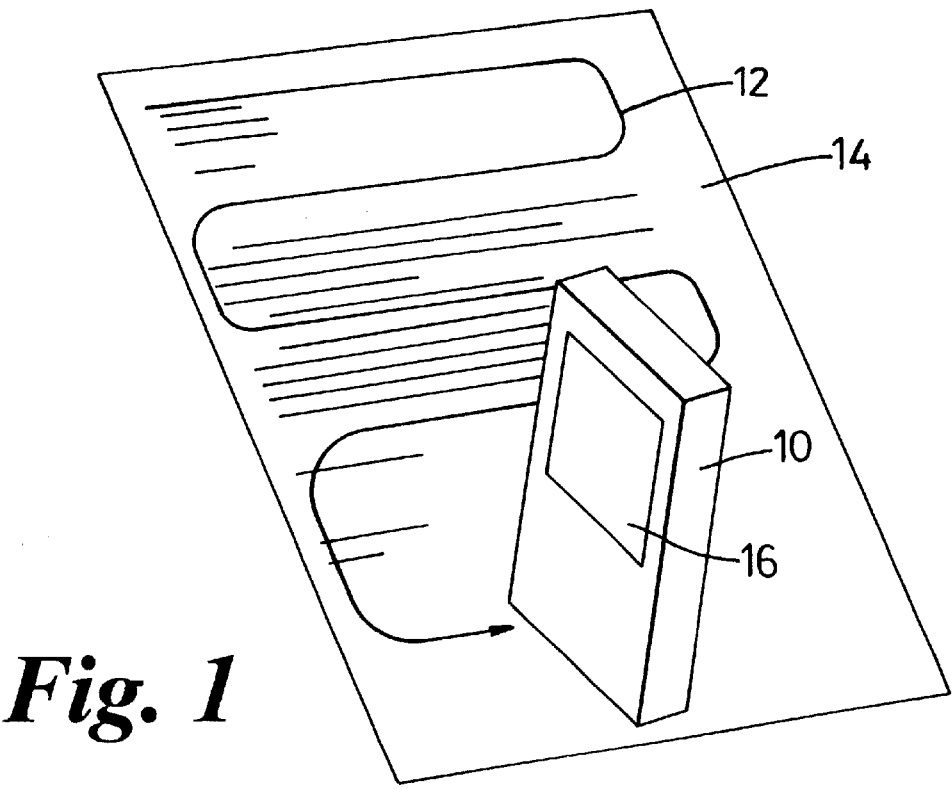
FIG. 1 is a perspective view of a hand-held scanning device following a meandering path on an original.

With reference to FIG. 1, a portable, hand-held scanning device 10 is shown as having followed a meandering path 12 along an original 14. The original may be a piece of paper, an overhead transparency film, or any other image-bearing surface. The inherent structure-related properties of the original may be used to provide position information during navigation along the meandering path. In this approach, the positions of inherent structural features are tracked and the position information is used to rectify image data, but other embodiments will be described. The scanning device is preferably self-contained and battery powered, but may include a connection to an external source of power or to data ports of computers or networks.

The scanning device 10 of FIG. 1 includes an image display 16 to allow viewing of a captured image. However, a display is not essential to the use of the scanning device.

Figure 2:
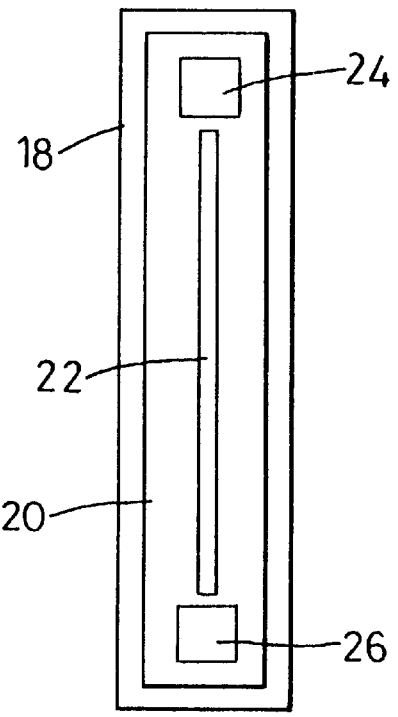
FIG. 2 is a rearward view of imaging and navigation sensors of the scanning device of FIG. 1.
Figure 3:
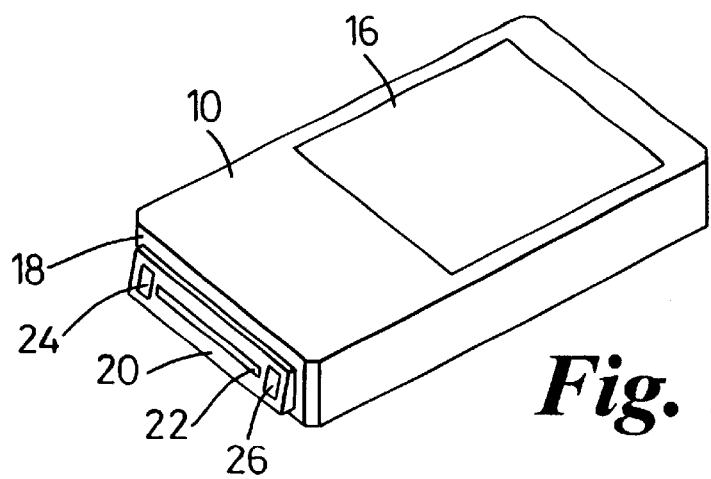
FIG. 3 is a perspective view of the scanning device of FIG. 1, shown with the imaging and navigation sensors exposed.

Referring now to FIGS. 1–3, the forward side 18 of the scanning device 10 includes a pivoting member 20 that aids in maintaining proper contact between the original 14 and an imaging sensor 22. The imaging sensor 22 comprises a linear array of image sensor elements. Navigation sensors 24 and 26 are located at the opposed ends of the imaging sensor. The navigation sensors 24,26 are mounted on the pivoting member and so the navigation sensors are in a fixed location relative to the imaging sensor.

The scanning device 10 allows three degrees of freedom, with two being in translation and one in rotation. The first degree is the side-to-side movement (X axis movement) along the original 14. The second degree of freedom is movement upwardly and downwardly along the original (Y axis movement). The third degree of freedom is the ability to operate the device with rotational misalignment of the imaging sensor 22 relative to an edge of the original 14. That is, the imaging sensor 22 may have an angle of attack that is not perpendicular to the direction of device translation.

For reasons of physical compactness, the imaging sensor 22 is preferably a contact image device, but for applications in which compactness is less of a concern or a smaller image is desired, sensors employing projection optics may be employed, with magnification less than unity. In such applications, the elements of the imaging sensor 22 should be smaller and more closely packed together. Contact imaging devices typically employ lenses sold under the trademark SELFOC, which is a trade mark of Nippon Sheet Glass Company Limited. Less conventionally, contact imaging can be obtained using interleaved array elements of sources and proximal sensors, without any imaging lenses. Conventional imaging sensors for scanning applications may be used. The imaging sensor may be part of a unit that also includes an illumination source, illumination optics, and image transfer optics.

The imaging sensor 22 is shown as a linear array of discrete optically sensitive elements. The spacing of the elements plays a role in determining the spatial resolution of the scanner 10. For example, a linear array having a length of 101.6 mm requires 1200 sensor elements to achieve a resolution of 300 dpi. The sensor may be a charged coupled device, an amorphous silicon photodiode array, or any other type of linear array sensor known in the art.

A key consideration in the design of the imaging sensor unit is speed. The imaging sensor 22 preferably is able to image each pixel at approximately 10K samples per second. Linear imaging arrays generally produce a serial data stream, wherein pixel values, i.e. charges, are placed into a shift register and then shifted out. Achieving the desired speed requires either very fast serial transfer rates out of the entire image array or multiple taps, so that pixel values can be shifted through fewer cells. This introduces parallelism, which is advantageous for digital processing.

Another consequence of the speed requirement is that the products of pixel areas, at the surface of the original, and their solid angles of emitted light collected and conveyed to each array element should be sufficiently large to produce a detectable signal in integration times on the order of 100 microseconds. An enhancement option is to add an optical element to the sensor to increase the effective fraction of sensor pitch for which each sensing element is responsive. Since there is typically unused area in the array matrix, such light collection optics increase sensitivity.

A straightforward modification of the imaging sensor 22 enables sensing of color images. Three linear arrays parallel to one another, each with at least one embedded filter element that selectively passes red, green and blue components of the incident light respectively, would allow color imaging. Alternatively, a single array having broad-band sensitivity may be sequentially illuminated by red, green and blue light sources.

Regarding illumination for improving the operation of the imaging sensor 22, a linear array of high intensity light emitting diodes at the amber wavelength may be used. However, the selection of the preferred illumination source and any optical elements is dependent upon the medium of the original. The wave-length of the light is selected to maximize the contrast image data acquired during the scan of a given area of the original 14, while disregarding unwanted signals. Illumination optics may consist of LED dome lenses or may include a light pipe consisting of a precision-molded optical element that channels the illumination onto the original with a minimal amount of light loss. Such a design can afford a relatively uniform illumination of a target area of the original at a wide range of angles, but blocks normal incident rays in order to avoid specular surface reflections.

In FIG. 1, the meandering path 12 is shown as having four and a fraction swaths, i.e. side-to-side passes across the original 14. A useful imaging sensor 22 for most opportunistic applications has a length within the range of 25.4 mm and 101.6 mm. If the sensor 22 has a length of 63.5 mm, an A4 paper can be scanned in four or five swaths. As will be explained more fully below, the swaths should include regions of overlap, so that a stitching process can be used to produce a faithful reproduction of the original image.

The scanning device 10 includes at least one navigation sensor 24 or 26. In the preferred embodiment, the device includes a pair of navigation sensors, with the sensors being at opposite ends of the imaging sensor 22. While a one-dimensional array of optoelectronic elements may be used, in the preferred embodiment, each navigation sensor is a two-dimensional array of elements. The navigation sensors 24 and 26 are used to track movement of the scanning device 10 relative to the original 14.

In a preferred utilisation, each navigation sensor 24 and 26 captures images related to inherent structure-related properties of the original in order to produce information related to the position of the scanning device 10. For most prior art scanning devices, inherent structural features are considered to be noise. For the scanning device 10 of FIGS. 1–3, such features are noise with regard to the imaging sensor 22, but may be used to provide a basis for the navigation sensors 24 and 26 to generate position information. Useful, high-contrast images of surface texture can be generated by detecting structural variations that are inherent to the medium or are formed on the medium, e.g., text. For example, images may be formed based upon the contrast between shadows in valleys and bright spots at the peaks of inherent structural features. Such features are typically microscopic in nature, often ranging between 10 $\mu$m and 40 $\mu$m in size on common printed media. As an alternative, speckle may be used, since specular reflec-tion of a coherent beam produces a contrast pattern of bright and dark areas. A third source of contrast information is color. Color contrast is independent of surface texture. Even when illuminating the texture-free surface with light in the visible range, color contrast exists between regions of different colors, e.g., between different shades of gray.

However, it is contemplated to use the invention for applications in which navigation information is independent of inherent structure-related properties of the original. For example, one or both of the navigation sensors 24 and 26 of FIG. 2 may be used to form successive images of print on the original, with correlation of the successive images being used to determine the position and the orientation of the image sensor 22 along the original 14. In this embodiment, all three sensors 22, 24 and 26 image text on the original, but only the signal from the sensor 22 is used to acquire image data. The signals from the navigation sensors 24 and 26 are used to acquire image-based navigation information.

As is discussed in U.S. Pat. No. 5,578,813, non-imaging approaches can also be used to acquire and process X, Y and angular position information. Unfortunately, many of the alternative means impose various limitations upon compactness, convenience of use, speed, freedom of motion, power consumption, accuracy, precision, and/or cost. One imaging-independent alternative available to acquiring position information is to provide one or more encoding wheels in place of the navigation sensors. Another image-free approach to acquiring navigation information is to use track balls similar to those for a computer mouse. Another image-free approach to acquiring position and orientation information is to provide an accelerometer. Yet another alternative approach would be to use any of a variety of mechanical linkages with which to track position and orientation relative to reference coordinates fixed with respect to the medium being scanned. Non-contacting remote sensing could also be used to measure position and orientation of the scanning device relative to reference coordinates fixed with respect to the scanned original.

The navigation sensors 24 and 26 of FIG. 2 effectively observe moving windows on the image of the original 14 and produce an indication of the displacement in two planar dimensions between successive observations. As will be explained more fully below, pixel values from the navigation sensors are processed to determine proper mapping of image data from the imaging sensor 22. Values of a particular pixel and its nearest neighbors are used to produce an array of correlation values at each pixel location. The correlation values are based upon comparisons between a current image of the surface structure and a stored image representing a known position of inherent structural features, wherein the stored image serves as a position reference. However, operations other than the correlation process may be employed in manipulating the input image data to form the output image.

Figure 4:
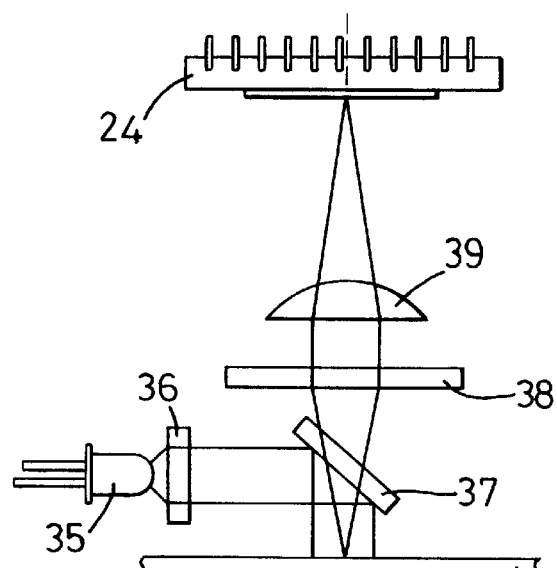
FIG. 4 is a schematical side view of an illumination system for one of the navigation sensors of FIG. 3.
Figure 5:
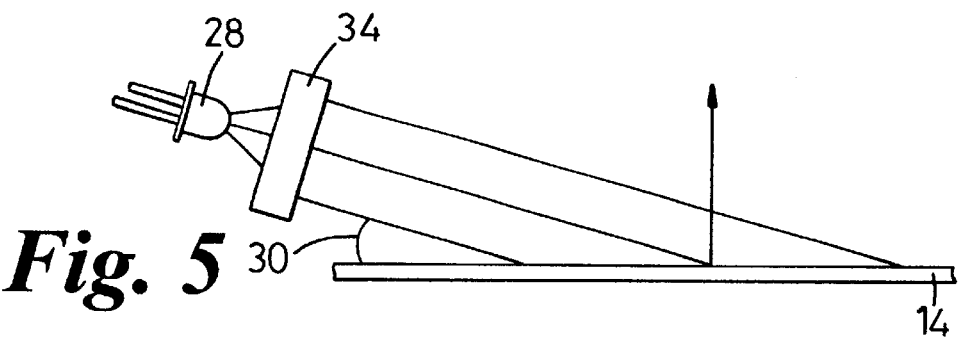
FIG. 5 is a side schematic view of a light emitting diode and optical elements for providing the illumination described with reference to FIG. 4.

Referring now to FIGS. 4 and 5, navigation sensor 24 is shown as being operatively associated with illumination optics. If the original 14 is a paper product for which paper fibers are to be detected by the navigation sensor 24, the introduction of light at a grazing angle of incidence is preferred. While not essential, one or more light emitting diodes (LEDs) 28 may be used. The grazing angle 30, which is the complement of the angle of incidence, is preferably in the range of zero degrees and fifteen degrees, but this may change depending upon the properties of the original 14. In FIG. 5, the source 28 is shown with illumination optics 34. The optics may comprise a single element or a combination of lenses, filters and/or holographic elements to accomplish suitable collimated and generally uniform illumination of the target surface. The wavelength of the light emitted by the source 28 should be selected to enhance the spatial frequency information available for navigation. Fixed pattern noise in the illumination field should be minimized. The output of source 28 may require adjustment to accommodate wide dynamic ranges of reflectivity of the medium as the scanning device proceeds over printed materials with absorbing or reflecting inks or other marking agents.

In FIG. 4, light from a source 35 is collimated at illumination optics 36 and then redirected by an amplitude splitting beam-splitter 37. That portion of the light energy from the LED directly to and transmitted through the beam-splitter is not shown in FIG. 4. The light energy from the beam-splitter illuminates the original 14 along the normal to the surface.

Also represented in FIG. 4 is the portion of the light energy that is reflected or scattered from the original 14 and passed through the beam-splitter 37 for aperturing and filtering at element 38 and focusing to an image at element 39. The portion of light energy passing from the original to the beam-splitter and reflecting from the beam-splitter is not shown. The magnification of navigation imaging optics should be constant over the field-of-view of the two-dimensional sensor array 24 which detects the focused light. In many applications, the modulation transfer functions, i.e. the amplitude measure of optical frequency response, of the navigation optics must be such as to provide attenuation before the Nyquist frequency that is determined by the pitch of the sensor elements of the navigation sensor and by the magnification of the optical elements. The optical elements should also be designed to prevent background illumination from creating noise. Note that a wavefront splitting beam-splitter could also be used.

The selection of the angle of incidence depends upon the material properties of the original. Grazing angles of illumination generate longer shadows and more apparent contrast, or AC signal if the surface of the original is not glossy. The DC signal level, however, increases as the illumination angle approaches the normal to the original.

Illuminating the target region of the original 14 at a grazing angle 30 works well for applications in which the surface of the original has a high degree of unevenness at the microscopic level. For example, the introduction of light from the source 28 at a grazing angle provides a high signal-to-noise ratio of data related to inherent structural features when the original is stationery, cardboard, fabric, or human skin. On the other hand, the use of incoherent light at a normal angle of incidence may be preferred in applications in which position data is needed to track scanner movement along such originals as photographs, glossy magazine pages, and overhead transparency films. With normal illumination, using incoherent light, viewing the original in the specularly reflected field will provide an image that is sufficiently rich in texture content to allow image and correlation-based navigation. The surface of the original has a microscopic relief such that the surface reflects light as if the surface were a mosaic of tiles, or facets. Many of the "tiles" of an original reflect light in directions slightly perturbed from the normal. A field of view that includes the scattered light and the specularly reflected light can thus be modeled as though the surface were composed of many such tiles, each tilted somewhat differently with respect to the normal. This modeling is similar to that of W. W. Barkas in an article entitled "Analysis of Light Scattered from a Surface of Low Gloss into Its Specular and Diffuse Components," in Proc. Phys. Soc., Vol. 51, pages 274–292 (1939).

FIG. 4 shows illumination by a source 35 of incoherent light, which is directed along the normal of the surface of the original 14. FIG. 5 describes illumination at a grazing angle 30. In a further alternative, no illumination is provided. Instead, the navigation information is accumulated using background light, i.e. light from the environment.

In a still further alternative, coherent illumination is introduced at normal incidence to permit speckle-based navigation. Relative motion between a scanning device and an original may be tracked by monitoring motion of speckle relative to the navigation sensors. If coherent illumination is used without using imaging optics, then by selecting a small area of illumination and by having a relatively large separation between the surface of the original and the photodetector array of the navigation sensor 24, the resulting predominant speckle cell sizes with coherent illumination are sufficiently large to satisfy the Nyquist sampling criterion. The use of a beam splitter allows the direction of both the incident illumination and the detected scatter to be near to normal to the surface of the original, as similarly accomplished in FIG. 4.

Figure 6:
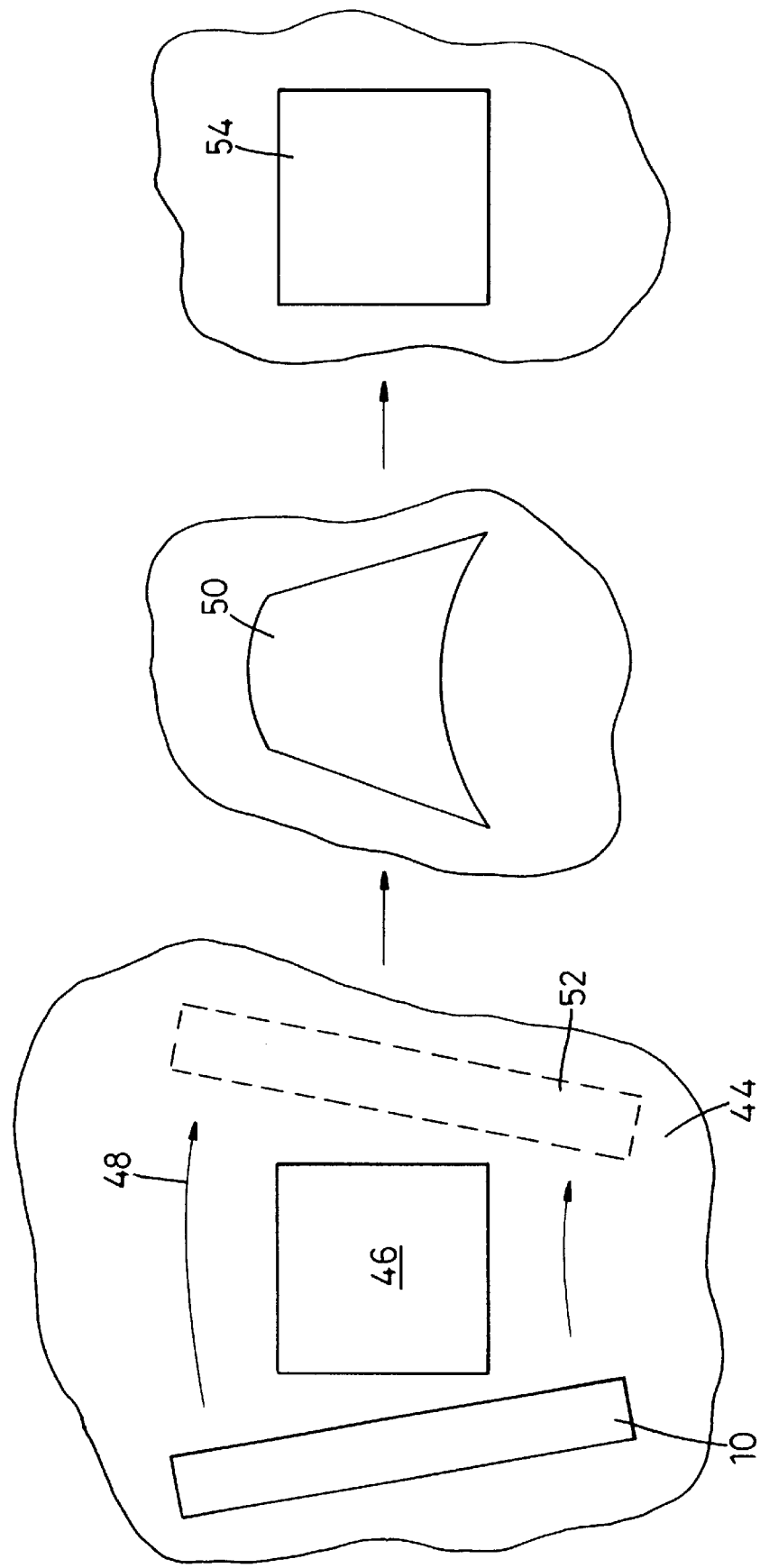
FIG. 6 is a conceptual view of the image capture operation of the scanning device of FIG. 1.

Referring now to FIG. 6, the scanner 10 is shown as being moved across an original 44 having a block 46 imprinted onto a surface of the original. Because the scanner is not subjected to any kinematic constraints in the plane of the original, there is a tendency for a user to follow a curvilinear path across the original, as when the hand and forearm of the user rotate about the elbow. In FIG. 6, the scanning device is shown as following a curved path 48 across the block 46. If the lower edge of the scanning device is the edge that is closer to the elbow that defines the axis of rotation, the lower edge will have a shorter radius. Consequently, imaging elements of an imaging sensor will vary with respect to the time and distance required to pass over the block 46. A distorted image 50 of the block is captured as the device is moved to the second position 52, shown in dashed lines.

The captured image 50 would be the stored image in the absence of processing to be described below. However, as the imaging sensor captures data related to the block 46, navigation information is acquired. In the described embodiment, one or more navigation sensors capture data related to inherent structural features of the original 44. Movement of the inherent structural features relative to the scanning device 10 is tracked in order to determine displacement of the imaging sensor relative to the block 46—accordingly, there is captured both sensor data, and sensor position detector data, from which used together a faithful captured image 54 may then be formed. The image 54 is defined herein as the "rectified" image. The process of rectification, to which the method according to the invention relates, is discussed in detail further below.

Figure 7:
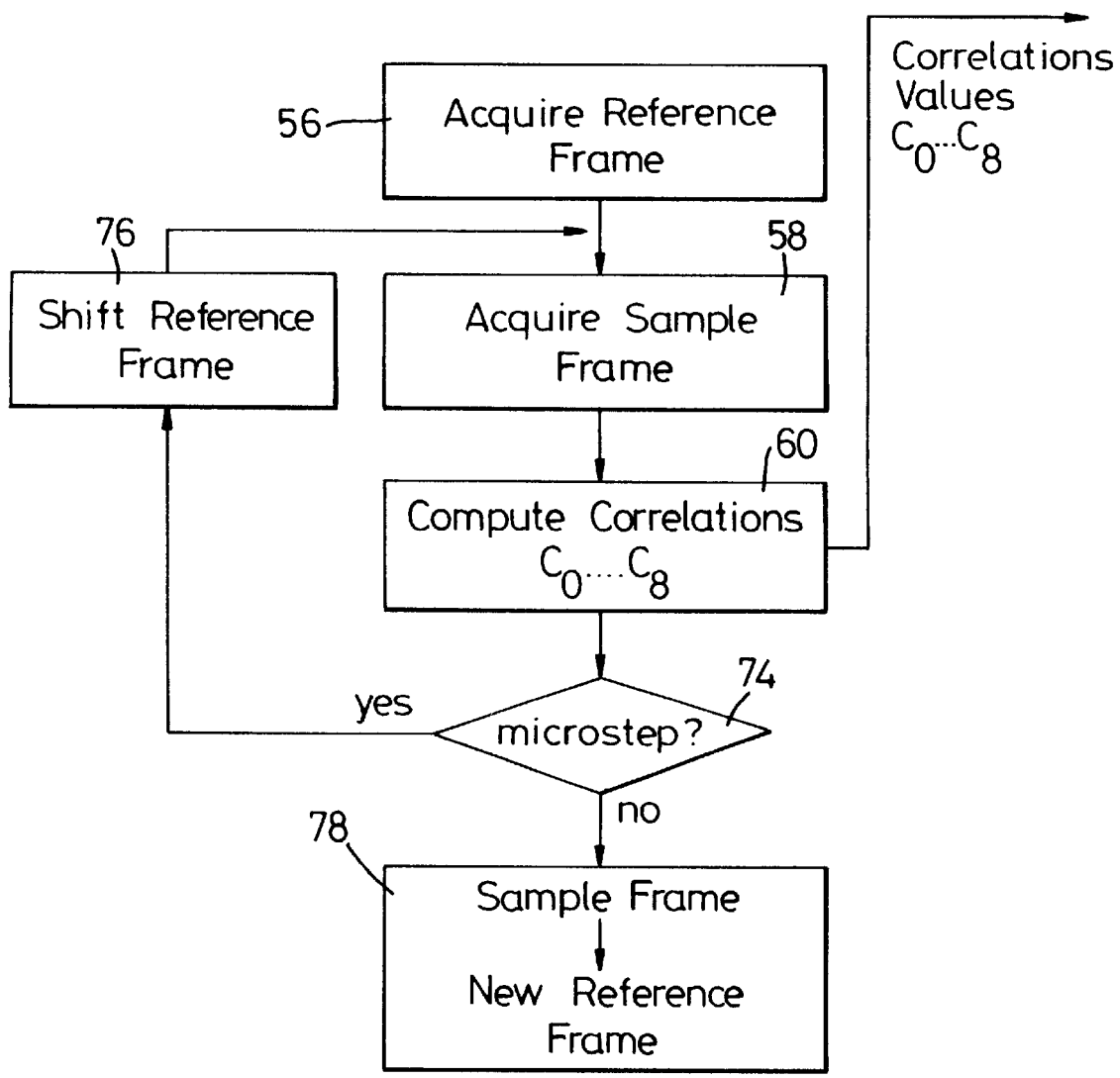
FIG. 7 is an operational view of one embodiment of the navigation processing of the scanning device of FIG. 1.

In FIG. 7, one embodiment of navigation processing is shown. The navigation processing is performed by correlating successive frames of navigation information, such as data related to inherent structural features. The correlations compare the positions of the inherent structural features in successive frames to provide information related to the position of a navigation sensor at a particular time. The navigation information is then used to rectify image data. The processing of FIG. 7 is typically performed for each navigation sensor.

In a first step 56, a reference frame is acquired. In effect, the reference frame is a start position. The position of a navigation sensor at a later time may be determined by acquiring 58 a sample frame of position data from the navigation sensor at the later time and then computing correlations 60 between the reference frame and the later-acquired sample frame.

Acquiring the initial reference frame 56 may take place upon initiation of the imaging process. For example, the acquisition may be triggered by mere placement of the scanning device into contact with the original. Alternatively, the scanning device may include a start button that initiates the image process and the navigation process. Initiation may also take place by a periodic pulsing of the illumination system of each navigator. If there is a reflected signal that exceeds a prescribed threshold of reflection or a correlation signal that indicates motion, the reference frame is then acquired.

Although the navigation processing is performed computationally, the concepts of this embodiment may be described with reference to FIGS. 7 and 8. A reference frame 62 is shown as having an image of a T-shaped inherent structural feature 64. The size of the reference frame depends upon factors such as the maximum scanning speed of the scanning device, the dominant spatial frequencies in the imaging of the structural features, and the image resolution of the sensor. A practical size of the reference frame for a navigation sensor that is thirty-two pixels (N) by sixty-four pixels (M) is 24×56 pixels.

At a later time (dt) a navigation sensor acquires a sample frame 66 which is displaced with respect to frame 62, but which shows substantially the same inherent structural features. The duration dt is preferably set such that the relative displacement of the T-shaped feature 64 is less than one pixel of the navigation sensor at the velocity of translation of the scanning device. An acceptable time period is 50 $\mu$s for velocities of 0.45 meters/sec at 600 dpi. This relative displacement is referred to herein as a "microstep."

If the scanning device has moved during the time period between acquiring 56 the reference frame 62 and acquiring 58 the sample frame 66, the first and second images of the T-shaped feature will be ones in which the feature has shifted. While the preferred embodiment is one in which dt is less than the time that allows a full-pixel movement, the schematic representation of FIG. 8 is one in which the feature 64 is allowed to shift up and to the right by one pixel. The full-pixel shift is assumed here only to simplify the representation.

Figure 8:
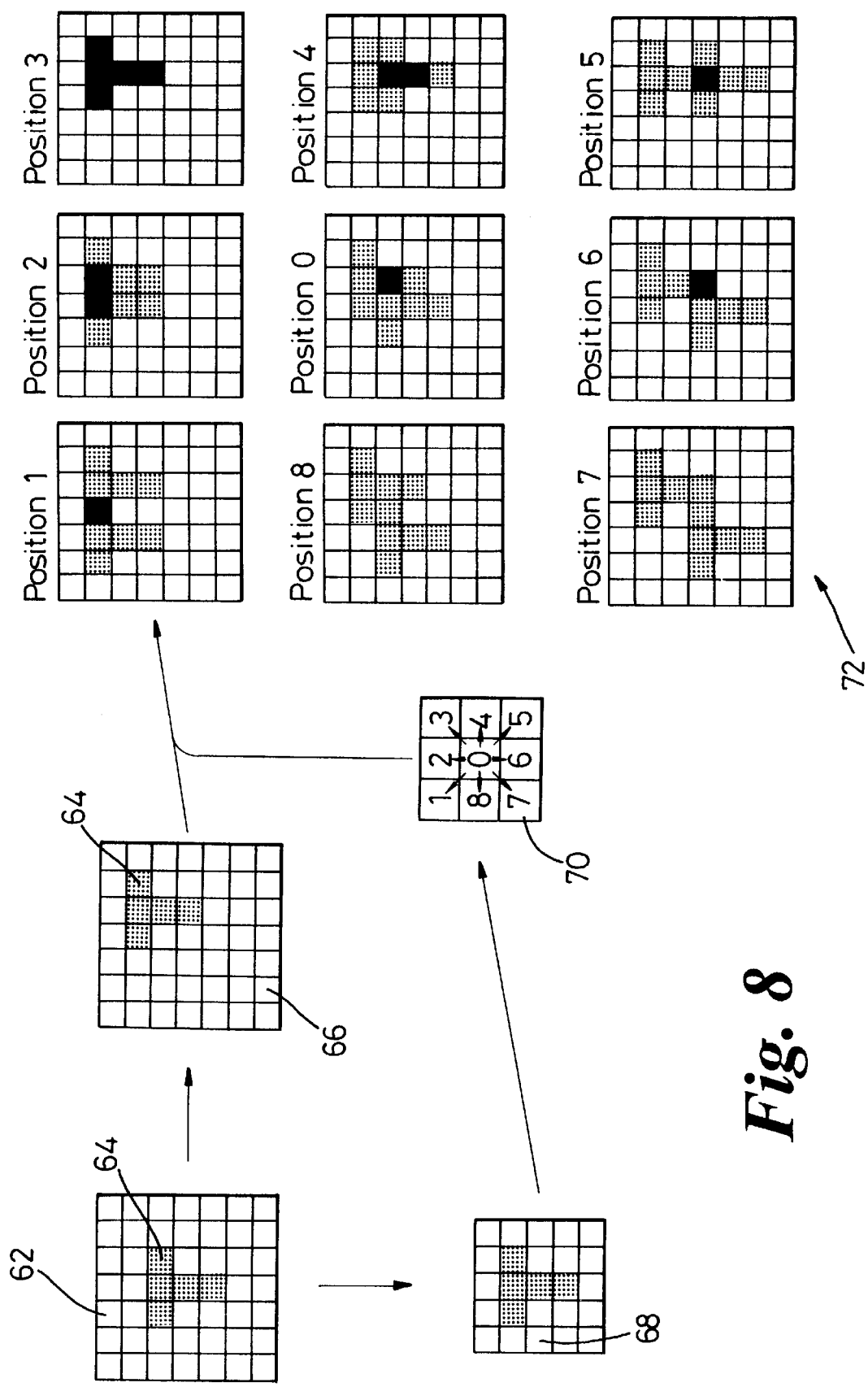
FIG. 8 is a schematic view of selected steps of FIG. 7.

Element 70 in FIG. 8 represents a sequential shifting of the pixel values of frame 68 into the eight nearest-neighbor pixels. That is, step "0" does not include a shift, step "1" is a diagonal shift upward and to the left, step "2" is an upward shift, etc. In this manner, the pixel-shifted frames can be combined with the sample frame 66 to produce the array 72 of position frames. The position frame designated as "Position 0" does not include a shift, so that the result is merely a combination of frames 66 and 68. "Position 3" has the minimum number of shaded pixels, and therefore is the frame with the highest correlation. Based upon the correlation results, the position of the T-shaped feature 64 in the sample frame 66 is determined to be a diagonal rightward and upward shift relative to the position of the same feature in earlier-acquired reference frame 62, which implies that the scanning device has moved leftwardly and downwardly during time dt.

While other correlation approaches may be employed, an acceptable approach is a "sum of the squared differences" correlation. For the embodiment of FIG. 8. there are nine correlation coefficients ($C_k=C_o, C_1 \ldots C_8$) formed from the nine offsets at element 70, with the correlation coefficients being determined by equation:

$$C_k = \Sigma_i \Sigma_j (S_{ij} - R_{(ij)+k})^2$$

where $S_{ij}$ denotes the navigation sensor-measured value at the position ij of the sample frame 66 and $R_{ij}$ denotes the navigation sensor-measured value at the frame 68 as shifted at the element 70 in the k direction, with k being the identifier of the shift at element 70. In FIG. 8, k=3 provides the correlation coefficient with the lowest value.

Correlations are used to find the locations of identical features in successive frames in order to determine the displacements of the features from frame-to-frame. Summing or integrating these displacements and correcting for scale factors introduced through the design of the relevant optics determine the displacements of the imaging sensor as a scanning procedure progresses.

As previously noted, the frame-to-frame correlations are referred to as "microsteps," since frame rates are chosen to be sufficiently high to ensure that the displacements do not exceed the dimension of a single pixel. Oversampling can provide sub-pixel displacement precision. Referring to FIG. 7, a determination 74 of whether a microstep is to be taken is made following each computation 64 of the correlations. If a microstep is required, the reference frame is shifted at 76. In this step, the sample frame 66 of FIG. 8 becomes the reference frame and a new sample frame is acquired. The correlation computation is then repeated.

While the process provides a high degree of correlation match, any errors that do occur will accumulate with each successive shift 76 of a sample frame 66 to the reference frame designation. In order to place a restriction on the growth rate of this "random walk" error, a sample frame is stored in a separate buffer memory. This separately stored sample frame becomes a new reference frame for a subsequent series of correlation computations. The latter correlation is referred to as a "macrostep."

By using macrosteps, a more precise determination of scanner displacement across a distance of m image frame displacements, i.e. m microsteps, can be obtained. The error in one macrostep is a result of a single correlation calculation, whereas the equivalent error of m microsteps is $m^{1/2}$ times the error in a single microstep. Although the average of errors in m microsteps approaches zero as m increases, the standard deviation in the average of errors grows as $m^{1/2}$. Thus, it is advantageous to reduce the standard deviation of accumulated error by using macrosteps having m as large as practical, as long as the two frames that define a macrostep are not so far spaced from one another that they have no significant region of common image content.

The sampling period dt does not have to be constant. The sampling period may be determined as a function of previous measurements. One method that employs a variable dt is to improve the accuracy of displacement calculation by keeping the relative displacement between successive reference frames within certain bounds. For example, the upper bound may be one-pixel displacement, while the lower bound is determined by numerical roundoff considerations in the processing of the navigation data.

Figure 9A:
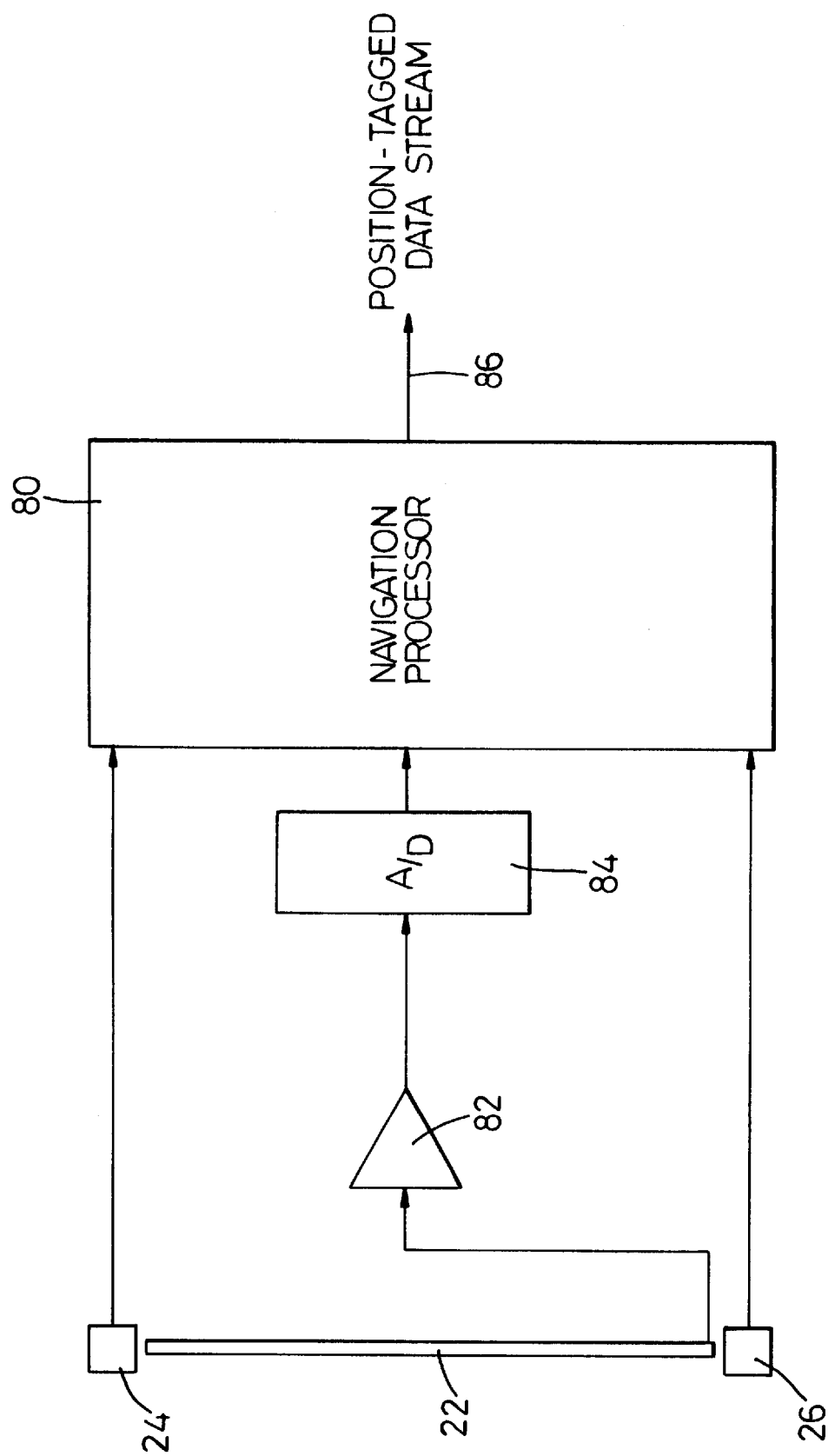
FIG. 9a is a block diagram of the components for carrying out the steps of FIG. 8.

Referring to FIG. 9a, the image signal generated at the imaging sensor 22 may then be position tagged based upon the navigation data. In one embodiment, pixel values from the navigation sensors 24 and 26 are received by a navigation processor 80 for performing the operations of FIGS. 7 and 8. Based upon the computed correlations, co-ordinates are determined for the current position of the first navigation sensor 24 and the second navigation sensor 26.

Within a macrostep the navigation processor 80 directly recovers the translational component of the motion of each navigation sensor. The data from both navigation sensors must be integrated to obtain an absolute position estimate that also takes into account any rotation of the scan head. Processor 80 maintains a model of the current orientation of the scan head with respect to its initial orientation. The individual estimates of the translation of each navigation sensor are interpreted with respect to this model. In turn the orientation of the scanner model is itself periodically updated.

In one embodiment the macrosteps of each navigation sensor are synchronised so that if the navigation sensor processor 80 requires a macro step in one navigation sensor, it also triggers a macrostep in the other. This simplifies the interpretation of the translations recorded by each navigation sensor. If at macrostep T the orientation of the scanner is θ degrees from vertical, then the recorded translation within the microstep of each navigation sensor is interpreted as follows.

Figure 9B:
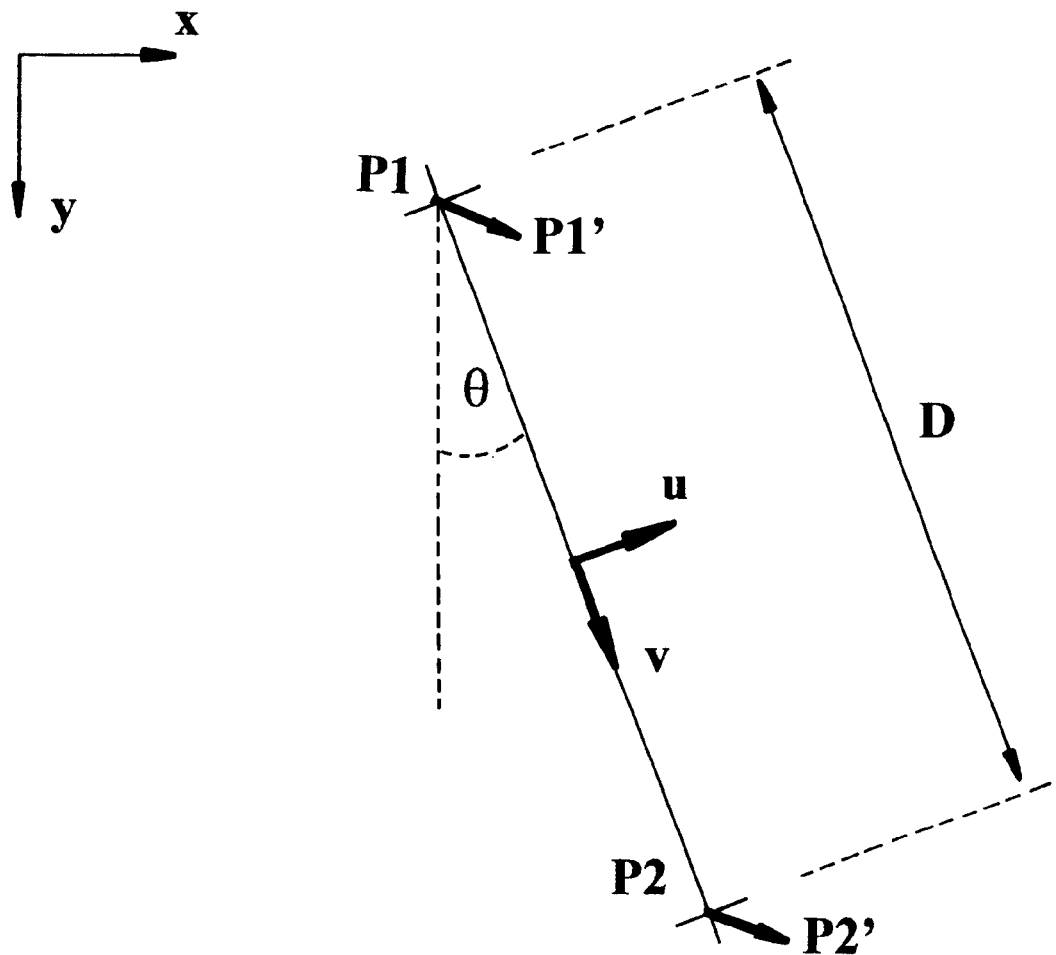
FIG. 9b illustrates interpretation of data in navigation processing.

FIG. 9b shows the motion of the navigation sensors as a pair. For each we have recorded translations with respect to a co-ordinate frame (with unit vectors labelled u and v) that describes orientation of the scanner. These have magnitude (u1, v1) and (u2, v2) for the first and second navigation sensors respectively. The objective is to interpret these translations to give the updated locations of the navigation sensors with respect to the global co-ordinate frame. In essence we are reconstructing the path from a piece-wise linear approximation of it, where the magnitude of the linear sections is determined by the size of the macrostep.

Each unit vector is related to the orientation of the scanner θ according to the following standard trigonometric relationships $$v = (\sin \theta, \cos \theta)$$

$$u = (\cos \theta, -\sin \theta)$$

but as we shall see estimates of u and v can be maintained without computationally expensive trigonometric calculation.

In FIG. 9b, P1 and P2 represent the navigation sensor locations, with respect to the global frame, at the start of the macrostep; they have values (x1, y1) and (x2, y2) respectively. The updated locations, with respect to the same global frame, some navigation sensor frames later are given by P1' and P2', which have values (x1', y1') and (x2', y2') respectively.

In the limit (which we assume we are close to in order to perform accurate integration) the v component of translation of each navigation sensor must be the same (shear affects each end equally, and in the limit rotation induces no v component at all). Hence we can set v1 and v2 to their mean value $$v=(v1+v2)/2$$

In which case the updated endpoint locations are given by $$P1'=P1+u1u+vv$$

and $$P2'=P2+u2u+vv$$

It is also convenient at this point to translate the position estimates for correspondence to the physical endpoints of the image sensor rather than the individual navigation sensors. This is done using calibration data that relates the physical locations of the navigation and image sensors. For simplicity, the end point positions are made to correspond to the centres of the first and last sensor elements of the image sensor.

Periodically we must update the inertial frame. This should only be done at the end of one macro frame or at the start of the next. It requires that the macrosteps be synchronised: that is if one navigation sensor triggers a new macrostep, because it has exceeded the maximum number of microsteps, a macrostep should also be triggered in the other navigation sensor even if has remained stationary throughout. This approach has the additional virtue that the rotation of the navigation frame is always small as the maximum rotation experienced must be always be less than the maximum number of microsteps divided by the baseline between navigation sensors.

Updating the inertial frame has the effect of adding back the lost rotational component of the motion of the scanner. This is determined implicitly from the differential translations experienced by the individual navigation sensors. Rather than explicitly calculating the rotational component of the motion, the inertial co-ordinate frame is updated directly from its relationship to the principal axis of the scanner (the line joining the navigation sensor locations). The v axis of the inertial frame is a unit vector along the principal axis going from navigation sensor 1 to navigation sensor 2 and the u axis is the unit vector orthogonal to it that completes the 2D basis.

The updated value for v is given by $$v'=(v'_x,v'_y)=(P2'-P1')/|P2'-P1'|=(P2'-P1')/D$$

and the orthogonal vector u by $$u'=(v'_y,-v'_x)$$

The length |P2'−P1'| is the constant (modulo navigation errors) length of the scanner, labelled D in FIG. 9b. This greatly simplifies the calculation of the inertial frame as it avoids need for calculating the square root of the sum of squares for each macrostep.

The navigation processor 80 also receives N pixel values of the imaging sensor 22 via a pixel amplifier 82 and an analog-to-digital converter 84. Although FIG. 9 shows only a single tap from the image sensor 22 and a single A/D converter 84, multiple taps, each with an A/D converter, are within the scope of the invention. The current position coordinates are "tagged" at the ends of a line of data that corresponds to the number of pixels within the imaging sensor. The output 86 of the navigation processor 80 is therefore a position-tagged data stream. The navigation processor 80 need not necessarily receive pixel data from the imaging sensor 22 and position information from the navigation sensors 22,24 at the same frame rate. The stream of position data may be used to update the estimate of the location of the endpoints of the linear sensor, which is generally at a higher spatial resolution than the pixel pitch of the linear sensor array. The optimum clocking frequency of the linear image sensor will generally be determined by the rate of motion of the scanner, in order that the fastest moving end is sampled at an amount just less than the pixel pitch of the linear sensor itself—otherwise either over-sampling or under-sampling will result. Over-sampling will result in increased computational and data processing requirements further along the image processing pipeline with little or no improvement in image quality, while under-sampling will result in a definite reduction in image quality.

One solution is to sample the linear sensor at a fixed frequency that would always result in over-sampling, that is it would exceed the sampling requirements of the fastest possible scanning speed. Then if the scanner is moving more slowly than the maximum scanning speed, unwanted samples are discarded by the navigation processor on the basis of the current endpoint position estimates. That is, the magnitude of the relative position of each endpoint since the last time a valid increment of linear sensor samples and tagged position data was output from the navigation processor 80 is used to gate the output of further increments. The simplest approach is to only allow output when one or other magnitude strictly equals or exceeds the pixel pitch (or a significant fraction of it). This approach is likely to result in under-sampling, particularly when scanning at just less than maximum scan speed. Alternatively, in order to prevent under-sampling, the current sample could be output if a prediction of the next linear sensor sample's relative end point positions exceeds the pixel pitch, where the prediction is based on the rate of change (or higher order numerical derivatives) of end-point position. A third approach which also prevents under-sampling is to introduce an increment buffer into the navigation processor, 80, so that the previous increment can be transmitted if the relative position data of the current increment exceeds the pixel pitch.

Each of the above sampling strategies are based upon synchronous sampling and will in general result in some degree of over or under sampling. A better overall solution that more closely achieves an ideal spatial sampling is for the navigation processor 80 to trigger the linear sensor capture asynchronously. One approach is for the relative end point position since the last valid capture (or a future prediction thereof) to be used directly to identify the best point in time to trigger the capture and sampling of the linear sensor.

Figure 10A:
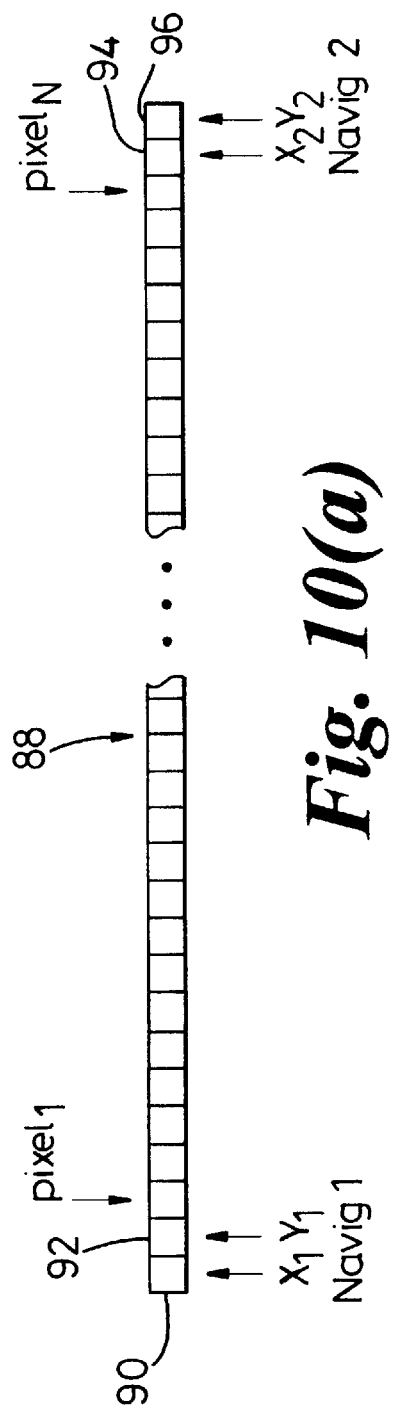
FIG. 10a is a representation of an increment of a position-tagged data stream typical of the output from the navigation processor of FIG. 9.

In FIG. 10a an increment 88 of the data stream is shown as having position coordinate cells 90, 92, 94 and 96 at the opposite ends of N pixel cells, although this ordering is not essential.

The imaging sensor 22 is clocked as the scanning device moves across an original. As is discussed above, the clocking ensures that the fastest moving element of the sensor samples at least once per pixel displacement.

Figure 10B:
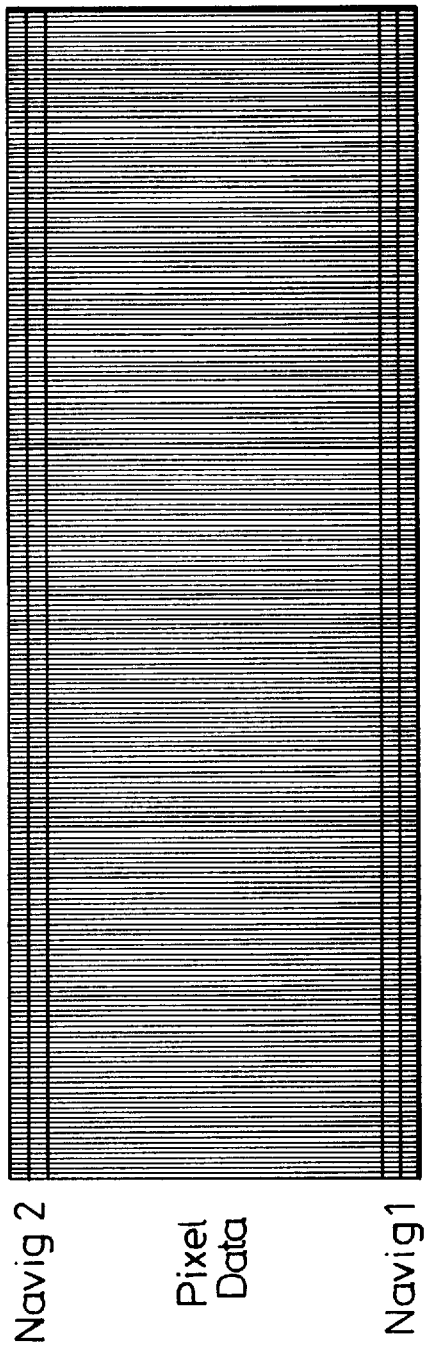
FIG. 10b is a representation of a buffer storing a multitude of position-tagged data increments.

The position-tagged data stream at the output 86 of the navigation processor 80 is buffered as shown in FIG. 10b. A buffer B holds a multitude of the increments 88 of FIG. 10a. The buffer B may be used to accommodate an entire scan in which case data compression may be used. This data is then mapped to rectilinear co-ordinates to form a final rectified reconstructed image in accordance with a method according to the invention, as will now be described.

Figure 11:
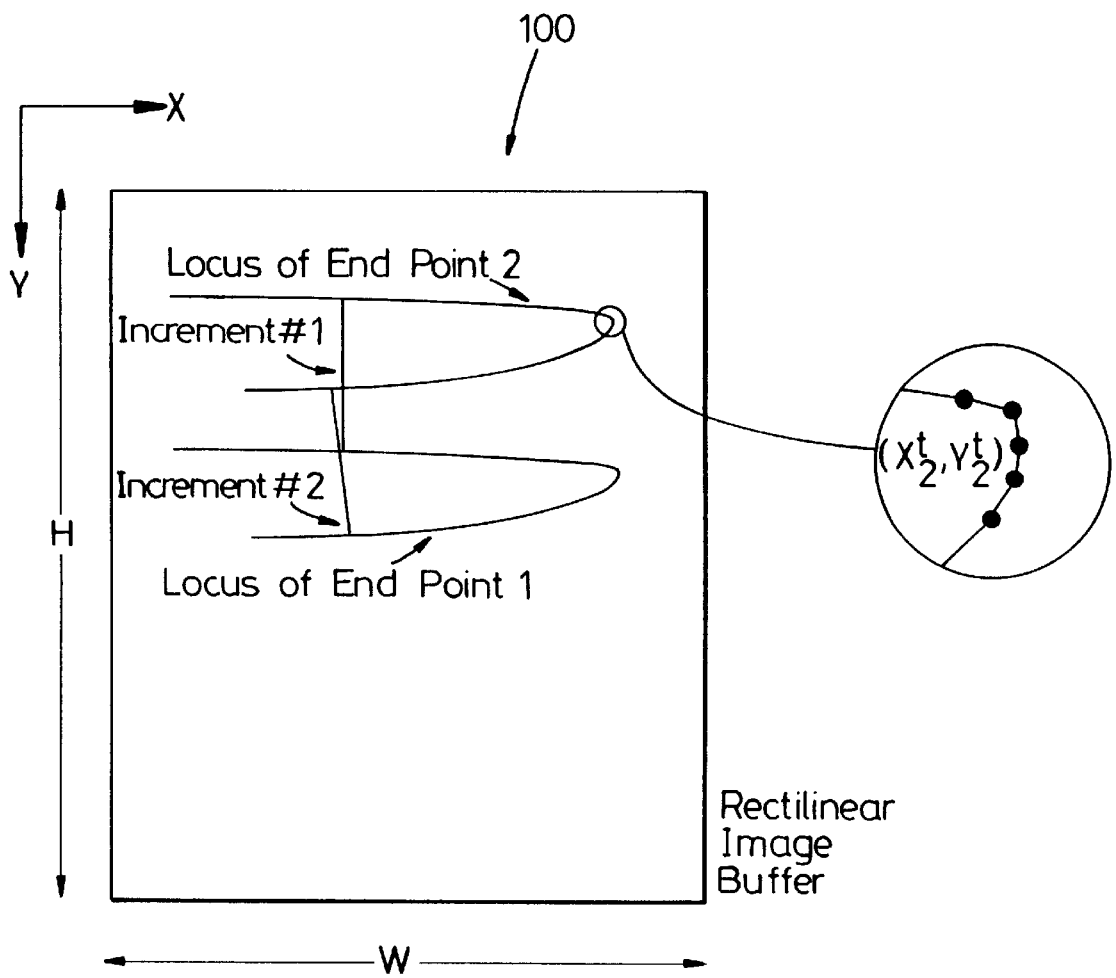
FIG. 11 shows a rectilinear image buffer showing the locus of the end points of the samples from the linear image sensor.

FIG. 11 shows the coordinate frame provided by the rectilinear image buffer 100, height H pixels by width W pixels, to which the stream of increments 88 are mapped to form the final rectilinear image. A simple two-dimensional array, of appropriate data type (here 8 bit greyscale; but could equally be 24 bit color or 1 bit binary), will suffice as a representation for the rectilinear image. The X and Y co-ordinates of the position tags associated with each increment correspond to the horizontal and vertical dimensions (column and row indices) of the rectilinear image space. Also shown are the loci of positions tags (shown enlarged in the scrap view for a short section, on the right) for each end point of the linear image sensor associated with a stream of increments. Within these a pair of increments (Increment #1 and Increment #2) are highlighted by joining their position tags with straight lines. These are chosen as almost intersecting in the overlap region where the scan doubles back on itself.

It is possible that the resolution of the rectilinear image buffer, which is determined by the output resolution required from the scanner (typically either 200 or 300 dpi) differs to that in which the endpoint position data is measured. That is in turn determined by the resolution of the navigation sensors 24 (which is dependent upon the spatial extent of the features, e.g. paper fibres, imaged during navigation). To accommodate such differences it is necessary for the endpoint position data to be scaled to the output pixel resolution.

The next operation is to map the position-tagged image increments within a swath into the rectilinear image buffer 100. It is particularly important that sufficient image quality is maintained in this process. One approach is simply to map the elements within each increment to the pixels of the rectilinear image array through which the straight line drawn between the endpoint locations passes. The mapping could either be to the closest linear sensor element for each image pixel, or involve interpolation between sensor elements. Appropriate linear or cubic interpolation methods for application in this context are described in Wolberg, "Digital Image Warping", pp 127–131, IEEE Computer Society Press, Los Alamitos, Calif., 1992.

Performing rectification in this way will inevitably introduce sampling artefacts because each increment has a distinct impact. Moreover, it will be necessary in practice that the original swath of position tagged image data is strictly over-sampled with respect to the rectilinear pixel grid (which may, for convenience, be at a higher spatial resolution than the pixel pitch of the linear sensor itself) otherwise pixel drop out will occur in the rectilinear image. These problems are solved in embodiments of the method according to the invention.

Figure 18:
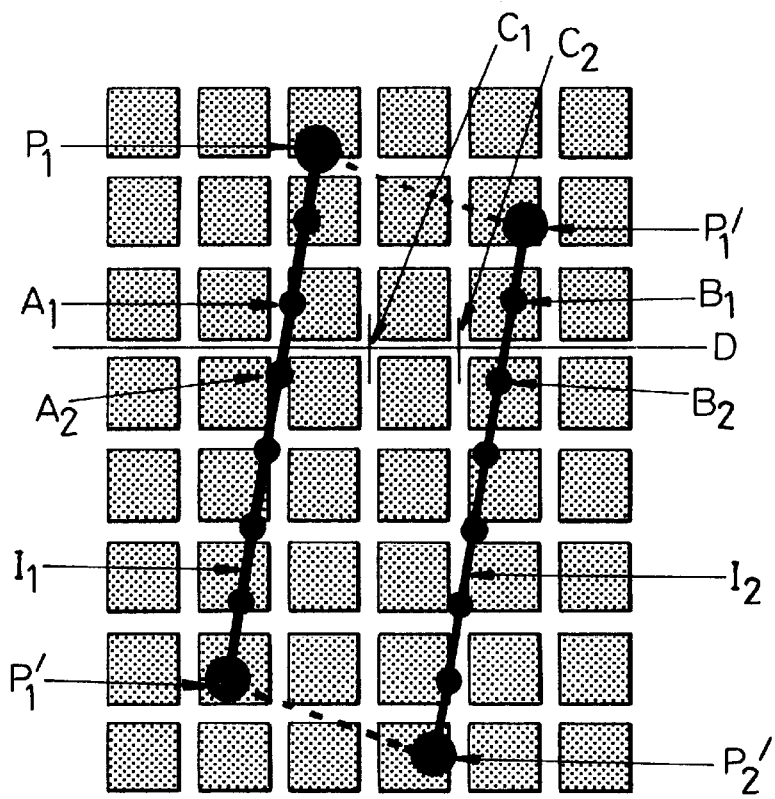
FIG. 18 shows a portion of a rectilinear pixel array defining the scanned image with two linear image sensor positions mapped thereon.

A solution provided by the invention is illustrated in FIG. 18. In this figure, the end point positions of a pair of increments I1 and I2 define a region. These increments can be a successive pair of linear sensor readings—the use of consecutive readings is termed here the PAIRWISE approach. Alternatively the increments I1 and I2 can be the bounding pair of a larger group of sensor increments—the use of such increments is here termed the CHUNKWISE approach. It will be shown that there is computational advantage to be gained in the CHUNKWISE approach from treating a group of increments in unison at the cost of some small reduction in image quality when compared with the PAIRWISE approach.

Pixel locations in the rectilinear array are associated with integer locations. For each such pixel within the region defined by a pair of increments, an intensity value is then computed by integrating a number of linear sensor pixels that map to a region around it. In particular preferred embodiments, various forms of bilinear interpolation are used to integrate a specific four linear sensor pixels taken from the pair of successive increments that span the pixels location: two sensor pixels from the increment that maps to a line that lies to one side of the rectilinear array pixel, and a further two sensor pixels from the adjacent increment that maps to a line on the opposing side of the rectilinear array pixel.

In FIG. 18 a pair of increments I1 and I2 are shown mapped into a portion of the rectilinear array that defines the scanned image. For simplicity end point positions P1, P2 and P1', P2' are made to correspond to the centre of the first and last sensor elements of increments I1 and I2 respectively. Intermediate sensor elements such as A1, A2 and B1, B2 are also shown. Pixels locations in the rectilinear image array are chosen to correspond to integer locations with respect to the end point position geometry. The resolution of the output rectilinear image may not be the same as that of the linear image sensor. However, irrespective of the actual resolution, N sensor pixels map along the line that joins the endpoints of each increment. For ease of explanation, in FIG. 18 N=8, that is each linear sensor has just 8 elements in it and the length of each increment is N-1=7 times the pixel pitch of the linear sensor as measured in output rectilinear pixel resolution units.

Specific pixels that lie within the region defined by a bounding pair of increments can be identified from the interval given by the x components of the intersects of each rectilinear image row with the two increments. An example is provided by pixels C1 and C2 on rectilinear image row D in FIG. 18. From simple geometry, if increment I1 has endpoint co-ordinates (x1, y1) and (x2, y2) then the x co-ordinate of its intersect with row D which has integer value yD is given by $$xD=(yD-y1)*(x2-x1)/(y2-y1)$$

it follows that the intersection with row D+1 is given by $$x(D+1)=xD+(x2-x1)/(y2-y1)=xD+xInc$$

where xInc is a constant increment for each successive row. Similarly if increment I2 has endpoint co-ordinates (x1', y1') and (x2', y2') then the x co-ordinate of its intersect with row D which has integer value yD is given by $$xD'=(yD-y1')*(x2'-x1')/(y2'-y1')$$

it follows that for the intersection of row D+1

$$x(D+1)'=xD'+(x2'-x1')/(y2'-y1')=xD'+xInc'$$

This provides a computationally effective way to compute the range of intersection for each row in turn. The intersections with the current row are computed by simply incrementing the intersections with the previous row.

First we must specify the range of rows that lie within the region. This is given by the range of integer y values that are common to both increments. These are the integer values in the range $$[Ceiling(Max(y1, y1')), Floor(Min(y2, y2'))]=[Y1, Y2]$$

assuming that the orientation of the scanner with respect to the paper remains roughly vertical. This approach can easily be extended to allow the scanner to be at an arbitrary orientation with respect to the page. For example, if the scanner is inverted the linear sensor data can be reversed and the polarity of the end point position data reversed. Furthermore, if the angle of the scanner is more than 45% from vertical correct rectification can be achieved by flipping the polarity of both the x/y position co-ordinates and the rows and columns of the image. For ease of explanation, the discussion of the embodiments will only deal with the roughly vertical case, but extension to the more general cases indicated above is a straightforward matter for the person skilled in the art.

The active pixels in the region can be identified in turn using the following pseudo code

```
TRANSFORM LOOP 1
{
    // INITIALISATION
    y = Y1
    xInc = (x2-x1)/(y2-y1)
    xInc' = (x2'-x1')/(y2'-y1')
    xD = x1+(y-y1)*xInc
    xD' = x1'+(y-y1')*xInc'
    // MAIN LOOP
    while (y<=Y2)
    {
        [X1, X2] = [Ceiling(xD), Floor(xD')]
        x = X1
        //INNER LOOP
        while (x<=X2)
            VISIT PIXEL (x, y)
        xD += xInc
        xD' += xInc'
        y++;
    }
}
``` where operators floor and ceiling have their usual mathematical interpretations. The actual details of the initialisation and inner loop are specific to the different methods described below. For simplicity of presentation in the embodiments of TRANSFORM LOOP shown, the assumption is made that xD is always less than xD'. It is straightforward to extend this to the generic case by testing the order of xD and xD' on each row.

The next step is to determine which linear sensor pixels make a contribution to each rectilinear grid pixel and in what proportions. A first embodiment of the PAIRWISE approach is now described.

Figure 19:
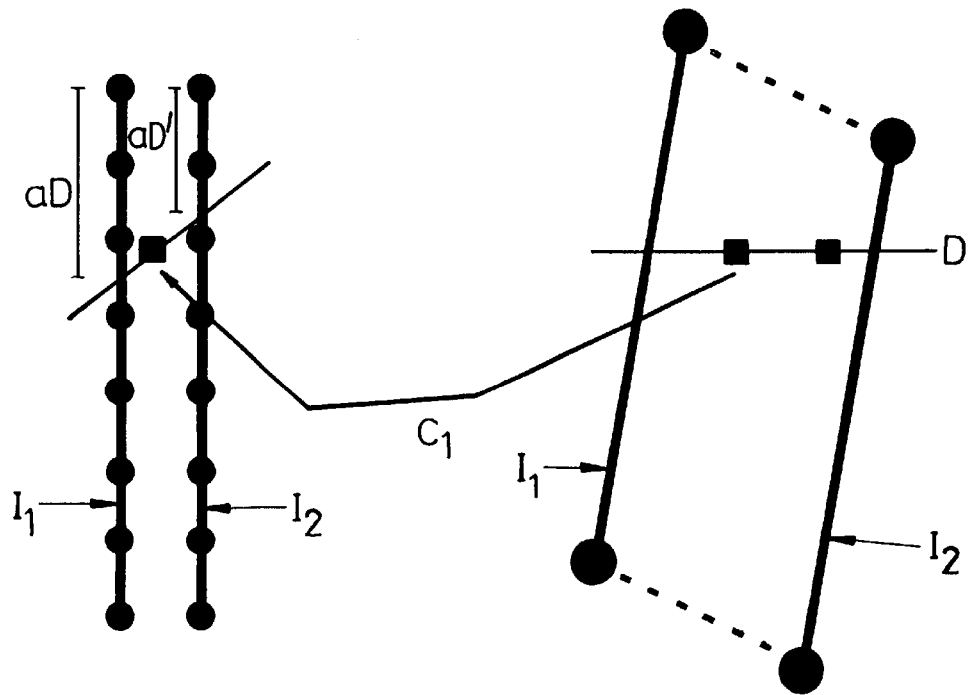
FIG. 19 shows the backmapping of a pixel in the rectilinear space of FIG. 18 on to a space defined by the two linear image sensor positions.

In this embodiment of the PAIRWISE approach to the method according to the invention, rectification is based upon an inverse mapping as used in computer graphics texture mapping (see for example Wolberg as referred to above at page 188) whereby each pixel in the interval delimited by the two lines that join the end point positions of the increments I1 and I2 is mapped backwards into a sub pixel location within a co-ordinate space defined between the pair of increments themselves. This situation is illustrated in FIG. 19 where the pair of increments I1 and I2 shown mapped into the rectilinear image in FIG. 18 also define a simple increment space where units are linear sensor pixel spacing, the increments align with the y axis and the increments are placed a unit pixel apart. Within this space the top sensor element of the left hand increment has co-ordinates (0, 0).

The pixel C1 from the rectilinear image is shown mapped between the increments I1 and I2. It has sub-pixel co-ordinates (x, Y.y) where Y is the integer component of the co-ordinate along the increment and x and y are the sub-pixel offset. A representative pixel value can then be determined using bilinear interpolation of the four surrounding pixels. That is:

$$\text{BiLinear}(I1,I2,Y,y,x)=I1[Y]*(1-x)*(1-y)+I2[Y]*(1-y)*x+I1[Y+1]*(1-x)*y+I2[Y+1]*x*y$$

The best approximation to the transform from the rectilinear image to the space between increments involves the solution of a quadratic for every pixel. This is not a satisfactory practical solution because of the expense of computation involved. While it is possible to derive approximate linear homogeneous mappings from rectilinear image co-ordinates to the co-ordinate space defined by a pair of increments, a non-homogeneous solution is preferable. With such a non-homogeneous solution no assumptions about the nature of the local transformation are required. It is also possible to solve easily for corner cases, such as when the projection of an adjacent pair of increments involves a cross-over in the rectilinear image space.

In such a non-homogeneous method, a different mapping is defined for each row of the rectilinear image in the interval [Y1, Y2]. This is again determined from the intersection of that row with the lines that connect the end-point positions. In this case, the distance of the intersection point along the line itself is recovered. This corresponds, after any scaling required for the differences in resolution, to a physical position along the linear sensor. In FIG. 19 aD and aD' are the intersection along increments I1 and I2 respectively for rectilinear row D; where from simple geometry $$aD=(yD-y1)*(N-1)/(y2-y1)$$

and $$aD'=(yD-y1')*(N-1)/(y2'-y1')$$

it follows for the intersection of row D+1

$$a(D+1)=aD+(N-1)/(y2-y1)=aD+a\text{RowInc}$$

and $$a(D+1)'=aD'+(N-1)/(y2'-y1')=aD+a\text{RowInc}'$$

which again gives a simple recurrence relationship for each successive row for efficient serial implementation.

Each pixel in the rectilinear image along row D in the interval [X1, X2] maps to a different point along a line in the increment space that joints the two points of intersection at (0, aD) and (1, aD') respectively. Assuming a linear mapping along this row the pixel at location (xE, yD) in the rectilinear image will map to location (aE, bE) in the increment space where:

$$aE=aD+(xE-xD)*(aD'-aD)/(xD'-xD)$$

and $$bE=(xE-xD)/(xD'-xD)$$

and again it follows for the next pixel along row D that $$a(E+1)=aE+(aD'-aD)/(xD'-xD)=aE+a\text{Inc}$$

and $$b(E+1)=bE+1/(xD'-xD)=bE+b\text{Inc}$$

Where the intensity at (aE, bE) is determined by the bilinear interpolation.

The additional initialisation and modified inner loop of TRANSFORM LOOP are

```
TRANSFORM LOOP 2
{
    // INITIALISATION
    y = Y1
    xInc = (x2-x1)/(y2-y1)
    xInc' = (x2'-x1')/(y2'-y1')
    xD = x1+(y-y1)*xInc
    xD' = x1'+(y-y1')*xInc'
    aRowInc = (N-1)/(y2-y1)
    aRowInc' = (N-1)/(y2'-y1')
    aD = (y-y1)*aRowInc
    aD' = (y-y1')*aRowInc'
    // MAIN LOOP
    while (y<=Y2)
    {
        [X1, X2] = [Ceiling(xD), Floor(xD')]
        x = X1
        aInc = (aD'-aD)/(xD'-xD)
        bInc = 1/( xD'-xD)
        a = (x1-xD)*aInc
        b = (x1-xD)*bInc
        // INNER LOOP
        while (x<=X2)
        {
            A = Floor(a)
            pixel[y][x] = BiLinear(I1, I2, A, a-A, b)
            a += aInc
            b += bInc
        }
        xD += xInc
        xD' += xInc'
        aD += aRowInc
        aD' += aRowInc'
        y++;
    }
}
```

More direct geometrical interpretation can also be used in other embodiments of the method according to the invention to perform PAIRWISE rectilinear pixel interpolation. Such methods do not require the explicit mapping of rectilinear image pixels back into an increment co-ordinate space.

Figure 20:
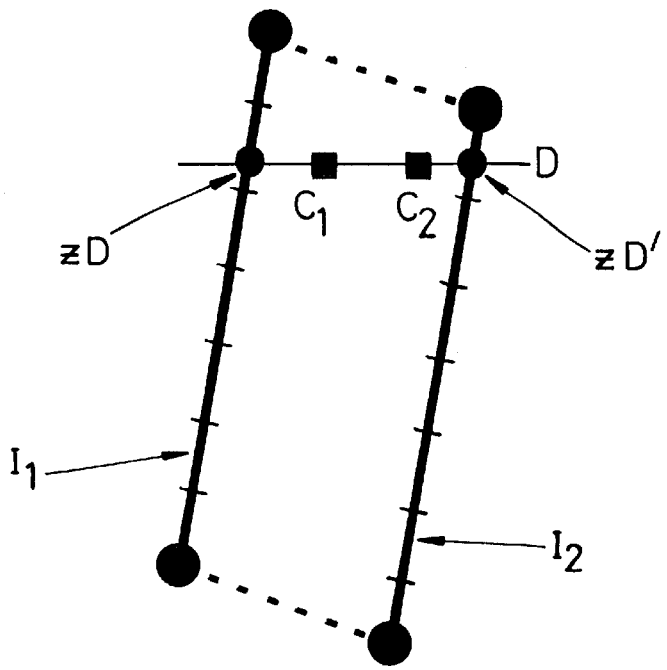
FIG. 20 shows the linear interpolation of pixel values in the image sensor positions shown in FIG. 18.

One particularly simple embodiment having reduced computational requirements with respect to the back projection approach is to perform interpolation along each increment and then interpolate these values directly in the rectilinear image. FIG. 20 shows interpolated pixel locations along each of the lines joining endpoints of the increments. As before the intersect is at location aD and aD' within the linear sensor pixels that constitute the increment, shown as zD and zD' within the rectilinear grid. Linear interpolation gives at these intersects "pixel values" vD and vD' as follows:

$$vD = I1[A]*(1-a) + I1[A+1]*a$$

and $$vD' = I2[A']*(1-a') + I2[A'+1]*a'$$

where $$A = \text{Floor}(aD) \text{ and } A' = \text{Floor}(aD')$$

and $$a = aD - A \text{ and } a' = aD' - A'$$

Next each integral pixel of the rectilinear grid image on row D in the range [X1, X2] is interpolated between these interpolated increment pixels. For example, the pixel at location xE is assigned intensity value vE as follows:

$$vE = (vD*((xD'-xD)-(xE-xD))+vD'*(xE-xD))/(xD'-xD)$$

and again it follows for the next pixel along row D that $$v(E+1) = vE + (vD'-vD)/(xD'-xD) = vE + vInc$$

which is exploited in serial implementation.

For this method the TRANSFORM LOOP becomes

```
TRANSFORM LOOP 3
{
    // INITIALISATION
    y = Y1
    xInc = (x2-x1)/(y2-y1)
    xInc' = (x2'-x1')/(y2'-y1')
    xD = x1+(y-y1)*xInc
    xD' = x1'+(y-y1')*xInc'
    aRowInc = (N-1)/(y2-y1)
    aRowInc' = (N-1)/(y2'-y1')
    aD = (y-y1)*aRowInc
    aD' = (y-y1')*aRowInc'
    // MAIN LOOP
    while (y<=Y2)
    {
        [X1, X2] = [Ceiling(xD), Floor(xD')]
        x = X1
        A = Floor(A)
        a = aD - A
        vD = I1[A]*(1-a) + I1[A+1]*a
        A' = Floor(A')
        a' = Ad' - a'
        vD' = I1[A']*(1"a') + I1[A'+1]*a'
        vInc = (vD'-vD)/(xD'-xD)
        v = vD + (X1-xD)*vInc
        // INNER LOOP
        while (x<=X2)
        {
            pixel[y][x] = v
            v += vInc
        }
        xD += xInc
        xD' += xInc'
        aD += aRowInc
        aD' += aRowInc'
        y++
    }
}
```

Note that the inner loop, where most of the computational cost is expended, is much simpler in TRANSFORM LOOP 3 than in TRANSFORM LOOP 2. It should be noted that higher order interpolation could be employed for greater accuracy at increased computational cost.

Better image quality can be achieved, at the cost of increased computation, by mapping each rectilinear image pixel to the closest point on each of the increments. These are the points on the increments whose interpolated (along the linear sensor) intensity best reflects the intensity of the rectilinear pixel under consideration. The pair of interpolated increment intensity values are then combined, again using a linear interpolation, to give the best representative intensity for the pixel. It should be noted that in this case, unlike the FIG. 20 case, the interpolated points on the increments and the rectilinear image pixel will not necessarily lie on a straight line.

Figure 21:
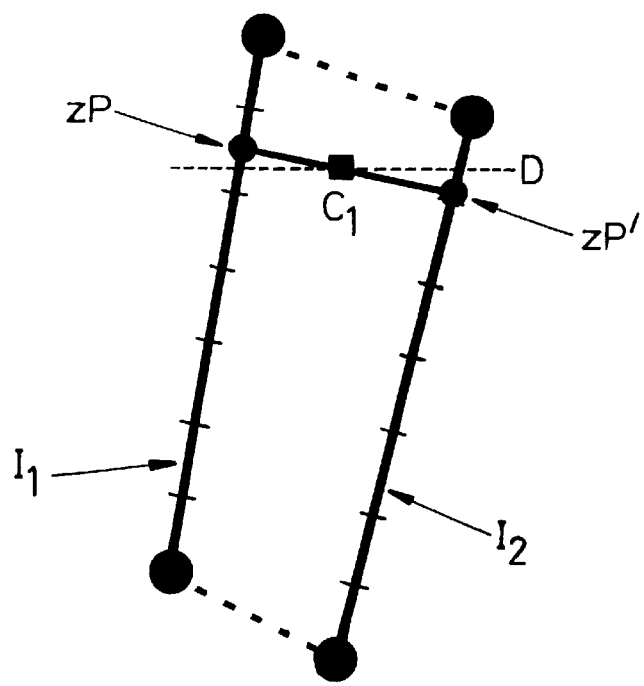
FIG. 21 shows a further form of linear interpolation of pixel values in the image sensor positions shown in FIG. 18.

The closest point on each of the increments is given by dropping a perpendicular from the rectilinear image pixel onto the line joining the endpoint positions. This point is scaled to a corresponding linear sensor element location. FIG. 21 shows the closest points at locations aP and aP' along the increments I1 and I2 respectively, designated zP and zP' with respect to the rectilinear grid.

The offset (in linear sensor element units) oE from aD (the intersect of the increment with rectilinear image row D) of the point of perpendicular projection along the increment I1 of a pixel on row D with x location xE, is given by $$oE=(xE-xD)*((x2-x1)/\text{SensorLength})*((N-1)/\text{SensorLength})$$

$$oE=(xE-xD)*(x2-x1)*(N-1)/\text{SensorLength}$$

where $$\text{SensorLength}'^2=(x2-x1)^2+(y2'-y1)^2$$

And the offset of the next pixel along row D with x location xE+1 is given by $$o(E+1)=(xE+1-xD)*(x2-x1)*(N-1)/\text{SensorLength}^2$$

$$o(E+1)=oE+(x2-x1)*(N-1)/\text{SensorLength}^2$$

$$o(E+1)=oE+o\text{Inc}$$

Similarly the offset (in linear sensor element units) oE' from aD' (the intersect of the increment with rectilinear image row D) of the point of projection along the increment I2 of a pixel on row D with x location xE, is given by $$oE'=(xE-xD')*((x2'-x1')/\text{SensorLength}')*((N-1)/\text{SensorLength}')$$

$$oE'=(xE-xD')*(x2'-x1')*(N-1)/\text{SensorLength}'^2$$

where $$\text{SensorLength}'^2=(x2'-x1')^2+(y2'-y1')^2$$

And the offset of the next pixel along row D with x location xE+1 is given by $$o(E+1)'=(xE+1-xD')*(x2'-x1')*(N-1)/\text{SensorLength}'^2$$

$$o(E+1)'=oE'+(x2'-x1')*(N-1)/\text{SensorLength}'^2$$

$$o(E+1)'=oE'+o\text{Inc}'$$

Clearly SensorLength equals SensorLength' and will remain constant throughout the scan.

Adding the offset to the row intersect location gives the closest sensor location to the pixel under consideration for each increment. That is for pixel at location (yD, xE)

$$aP=aD+oE$$

and $$aP'=aD'+oE'$$

interpolation between the linear sensor pixels gives intensity values, vP and vP', for these points on increment I1 and I2 respectively $$vP=I1[A]*(1-a)+I1[A+1]*a$$

where $$A=\text{Floor}(aP) \text{ and } a=aP-A$$

and $$vP'=I1[A']*(1-a')+I1[A'+1]*a'$$

where $$A'=\text{Floor}(aP') \text{ and } a'=aP'-A'$$

We have a choice of coefficients for the combination of vP and vP' to give the final interpolated pixel value. One possibility is use the length of the perpendiculars dropped to the respective increments. For ease of computation the relative x displacement of the pixel under consideration along the row D from the points of intersection with the two increments is preferred. For increment I1 this has value (xE−xD) and for increment I2 it has value (xD'−xE). Given that the total range of x is (xD'−xD) then the interpolated intensity of this pixel is $$v=((xD'-xE)*vP+(xE-xD)*vP')/(xD'-xD)$$

Next further embodiments of the method according to the invention employing the CHUNKWISE method of rectilinear mapping will be presented. The CHUNKWISE approach has the twin advantages that the outer loop of the appropriate version of TRANSFORM LOOP is computed less frequently and that larger numbers of output pixels are accessed sequentially which leads directly (without the need for a cache) to improved memory bandwidth.

Figure 22:
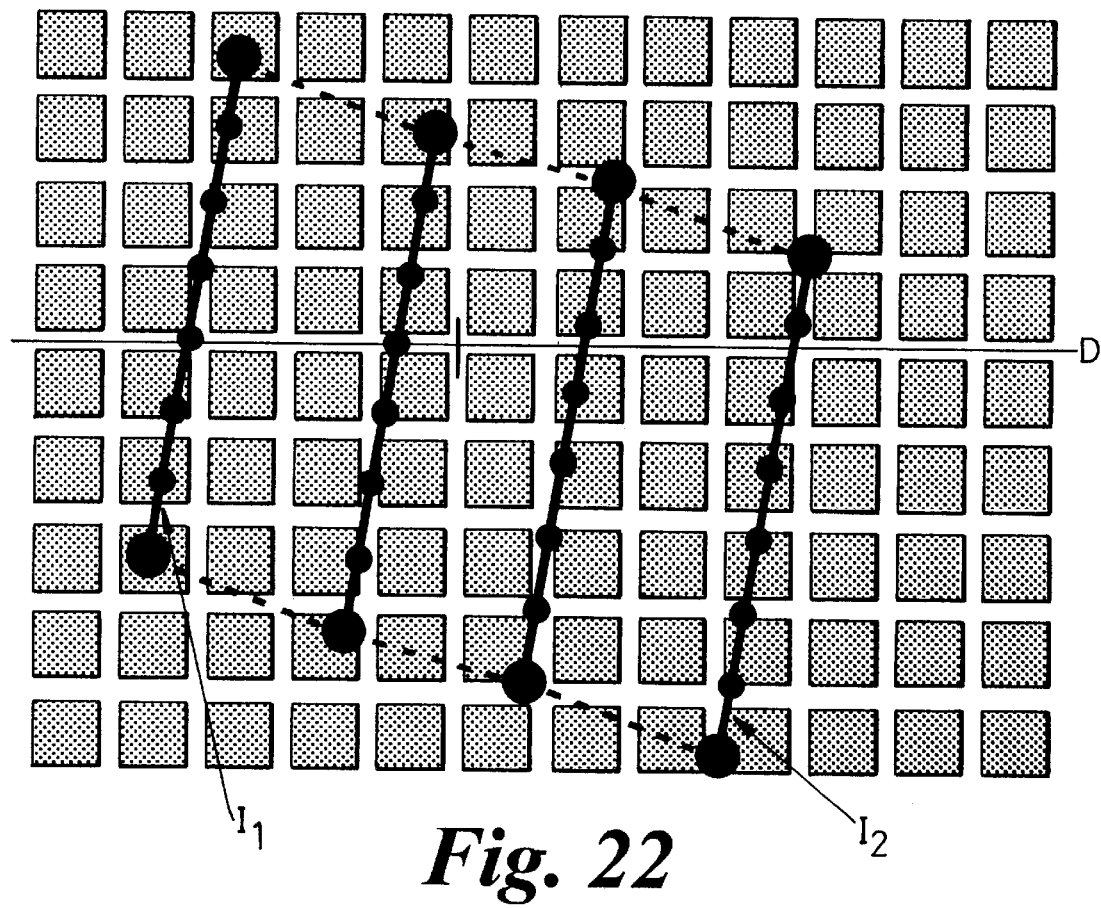
FIG. 22 shows a portion of a rectilinear pixel array defining the scanned image with a series of linear image sensor positions mapped thereon.
Figure 23:
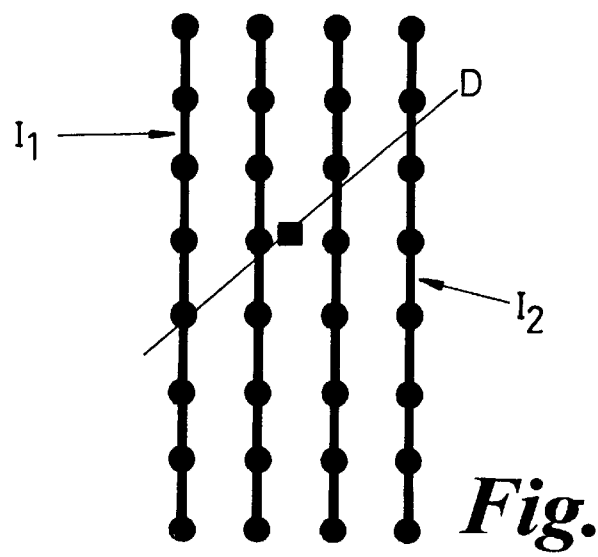
FIG. 23 shows the backmapping of a pixel in the rectilinear space of FIG. 21 on to a space defined by the linear image sensor positions.

FIG. 22 shows a chunk consisting of M, in this case 4, increments. The outer pair of increments, labelled I1 and I2, are again used by the outer loop of TRANSFORM LOOP to identify valid pixels that map within the chunk. Preferred embodiments determine rectilinear array pixel values with an extended form of non-homogeneous back projection algorithm as described previously for the PAIRWISE case. FIG. 23 shows the transformation of a row labelled D in FIG. 22 into an increment space that contains the 4 increments bounded by I1 and I2. It joins the points of intersection of row D with each of the outer increments. Following on from the PAIRWISE case, as shown in FIG. 19, these intersections have offset distances along the linear sensor of aD and aD' respectively for I1 and I2. The co-ordinates of the intersection points in the increment space are thus (0, aD) and ((M−1), aD').

Each pixel in the rectilinear image along row D in the interval [X1, X2] maps to a different point along a line in the increment space that joins the two points of intersection at (0, aD) and ((M−1), aD') respectively. Assuming a linear mapping along this row the pixel at location (xE, yD) in the rectilinear image will map to location (aE, bE) in the increment space where:

$$aE=aD+(xE-xD)*(aD'-aD)/(xD'-xD)$$

and $$bE=(M-1)*(xE-xD)/(xD'-xD)$$

and again it follows for the next pixel along row D that $$a(E+1)=aE+(aD'-aD)/(xD'-xD)=aE+a\text{Inc}$$

and $$b(E+1)=bE+(M-1)/(xD'-xD)=bE+b\text{Inc}$$

Where the intensity at (aE, bE) is determined by the bilinear interpolation.

Hence TRANSFORM LOOP becomes:

```
TRANSFORM LOOP 4
{
    // INITIALISATION
    y = Y1
    xInc = (x2-x1)/(y2-y1)
    xInc' = (x2'-x1')/(y2'-y1')
```

```
-continued
    xD = x1+(y-y1)*xInc
    xD' = x1'+(y-y1')*xInc'
    aRowInc = (N-1)/(y2-y1)
    aRowInc' = (N-1)/(y2'-y1')
    aD = (y-y1)*aRowInc
    aD' = (y-y1')*aRowInc'
    // MAIN LOOP
    while (y<=Y2)
    {
        [X1, X2] = [Ceiling(xD), Floor(xD')]
        x = X1
        aInc = (aD'-aD)/(xD"-xD)
        bInc = (M-1)/( xD'-xD)
        a = (x1-xD)*aInc
        b = (x1-xD)*bInc
        // INNER LOOP
        while (x<=X2)
        {
            A = Floor(a)
            B = Floor(b)
            pixel[y][x] = BiLinear(IB, IB+1, A, a-A, b-B)
            a += aInc
            b += bInc
        }
        xD += xInc
        xD' += xInc'
        aD += aRowInc
        aD' += aRowInc'
        y++;
    }
}
```

Where IB is the B'th increment in the chunk and IB+1 is the (B+1)'th increment in the chunk.

The CHUNKWISE method relies on the fact that scan path is almost uniform and only smoothly changing. This must be true both spatially (the scan should be a uniform shape) and in terms of the sampling frequency along the scan path (the scan should be sampled uniformly). Further embodiments of the invention involve the extension of the CHUNKWISE method by variation of the chunk-size dynamically depending upon the degree of uniformity of the scan path. Where uniformity is good, a large chunk can be accommodated without introduction of image distortion, but where the scan path or sampling regime were to vary rapidly, only a small chunk-size could be accommodated without introducing artefacts. In the limiting case, such embodiments revert to a PAIRWISE method.

A method for dynamically varying the chunk-size in accordance with embodiments of the invention is now described. For an acceptable use of the CHUNKWISE method, the individual differences in end point position geometry that exist for each successive pair of increments in the chunk should agree with the global differences for the whole chunk. In the method a table of increment position deltas is built between each successive pair of increments within the chunk as the size of the chunk is increased from a single pair towards a maximum. The preferred chunk-size S is chosen to be the largest, less than or equal to the maximum allowed chunk-size, for which the individual deltas agree with the overall position increment over the chunk as a whole.

Each entry in the table consists of 4 increment values. These correspond to the x and y increments of each end-point's position. These are labelled [X1i, Y1i, X2i, Y2i] for the increment pair that ends on the ith increment in the chunk. The accumulated total increment for the whole chunk is denoted [X1N, Y1N, X2N, Y2N] and is given by the sum of the individual increments for each component. The table is built for values of N starting at 2 and stepped towards the maximum allowed chunk-size at each step. If any one of the following conditions is not satisfied for each i in the range 2 to the current value of N

|X1i*N-X1N|<N*deltaThreshold

|X2i*N-X2N|<N*deltaThreshold

|Y1i*N-Y1N|<N*deltaThreshold

|Y2i*N-Y2N|<N*deltaThreshold then a chunk-size of s=N−1 is chosen. If this condition is satisfied at all steps up to the maximum allowed chunk-size then the maximum allowed chunk-size is selected.

In accordance with further embodiments of the invention, an effective method for overcoming non uniformity in the sampling frequency at which individual increments within a chunk are acquired will now be described. This method does not deal with non-uniformity in the shape of the scanned path, but only in the physical separation between successive increments. Such embodiments will be advantageous in implementations in which increments are sampled in an uneven way. It is however generally desirable to ensure that all the samples for a whole chunk are sampled as evenly as possible.

An auxiliary mapping table is introduced for this purpose. The purpose of the auxiliary mapping table is to map the uniform x co-ordinate of the increment space (at some specified sub-pixel resolution, e.g. 0.1 of a pixel) into a modified version that is sampled uniformly. The table must be updated for each chunk on the basis of the physical spacing (e.g. the mean of the Euclidean end-point spacing) of the individual increments within it. The effect of the modification is as illustrated in FIG. 24.

Figure 24:
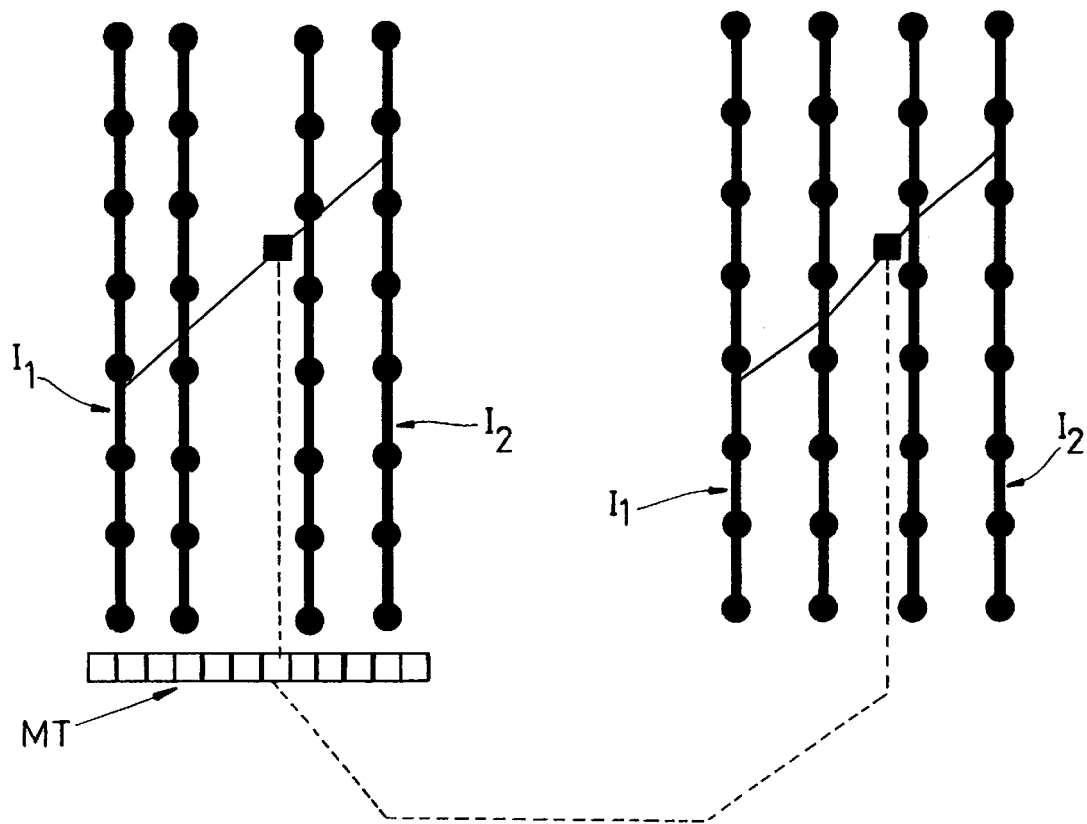
FIG. 24 shows the use of an auxiliary mapping table to normalise a space defined by linear image sensor positions.

In FIG. 24, increments are shown according to their mean physical spacing normalised so that the total spacing is equal to one less than the number of increments. Within this space, the mapping of rectilinear image row D remains linear between increments I1 and I2. A rectilinear image pixel that maps to linear increment space location (x,y) shown in FIG. 24 is transformed to (x',y) in the non-linear increment space shown in FIG. 24. In the transformed space, the increments are uniformly spaced, but the mapping between I1 and I2 is no longer linear. Auxiliary table MT is used to map each x to x'.

Further embodiments of the invention will become apparent to the skilled man from study of the teaching set out above. In the PAIRWISE case we require 2 increments to be buffered and each increment is used twice. In the CHUNKWISE method M increments are stored and only the first and last elements in a chunk are used twice. First for the case where they are the trailing increment in the chunk and then latter when they become the leading sample of the next chunk.

The rectilinear image buffer 100 is large enough to accommodate a single letter sized or A4 sized page at the resolution of the linear sensor (typically either 200 or 300 dpi) The position and orientation of the origin of the scan are assumed to be known apriori. Increments which either partially or wholly map outside the image can be wrapped (using modulo arithmetic with respect to W and H for X and Y components respectively) around the horizontal and vertical boundaries to continue at the opposite side of the rectilinear buffer. After completion of the scan, the rectilinear image buffer memory 100 can be rolled both horizontally and vertically to centre the scanned region. Provided that the scanned region does not exceed either the overall height or width of the rectilinear buffer 100 then the final image will be well formed independent of the initial starting position. To obtain proper alignment, either the scan must begin at the assumed orientation (e.g. always parallel to the side of the page) or orientation must be recovered from the content of the scan and be used to reorient the final image. Methods for automatically determining the dominant orientation of text on a page, which can be used as a basis for the latter, are known in the literature eg. "The Skew Angle of Printed Documents" by H. S Baird. Proc 4th SPSE Conference Symposium on Hybrid Image Systems, Rochester, N.Y. 1987.

The next step is to stitch successive image swaths within their region of overlap. The aim is to combine multiple swaths within the buffer 100 containing a final rectified reconstructed image. This should be done in such a way as to identify and correct most of the accumulated navigation error and to mask any residual error. This is discussed more fully in International Patent Application Publication No. WO 96/27257.

Advantageously, the stream of navigation data provides the registration information needed for stitching. Since the navigation signal tends to accumulate error, it is continually amended by feeding back a correction signal derived from analysis of feature offsets.

However, first we will describe a method of stitching image swaths which assumes that there are no navigation errors.

Some area of overlap is necessary in order to stitch two image swaths. Swaths are delimited by a reversal in the path of the scanning device back over a region of the original of which a part has just been scanned. A swath comprises the image data captured during a scanning swipe across an original being scanned. In the following description, the term 'swath' will also sometimes be used to refer to the part of the reconstructed image formed from mapping such data.

Figure 12:
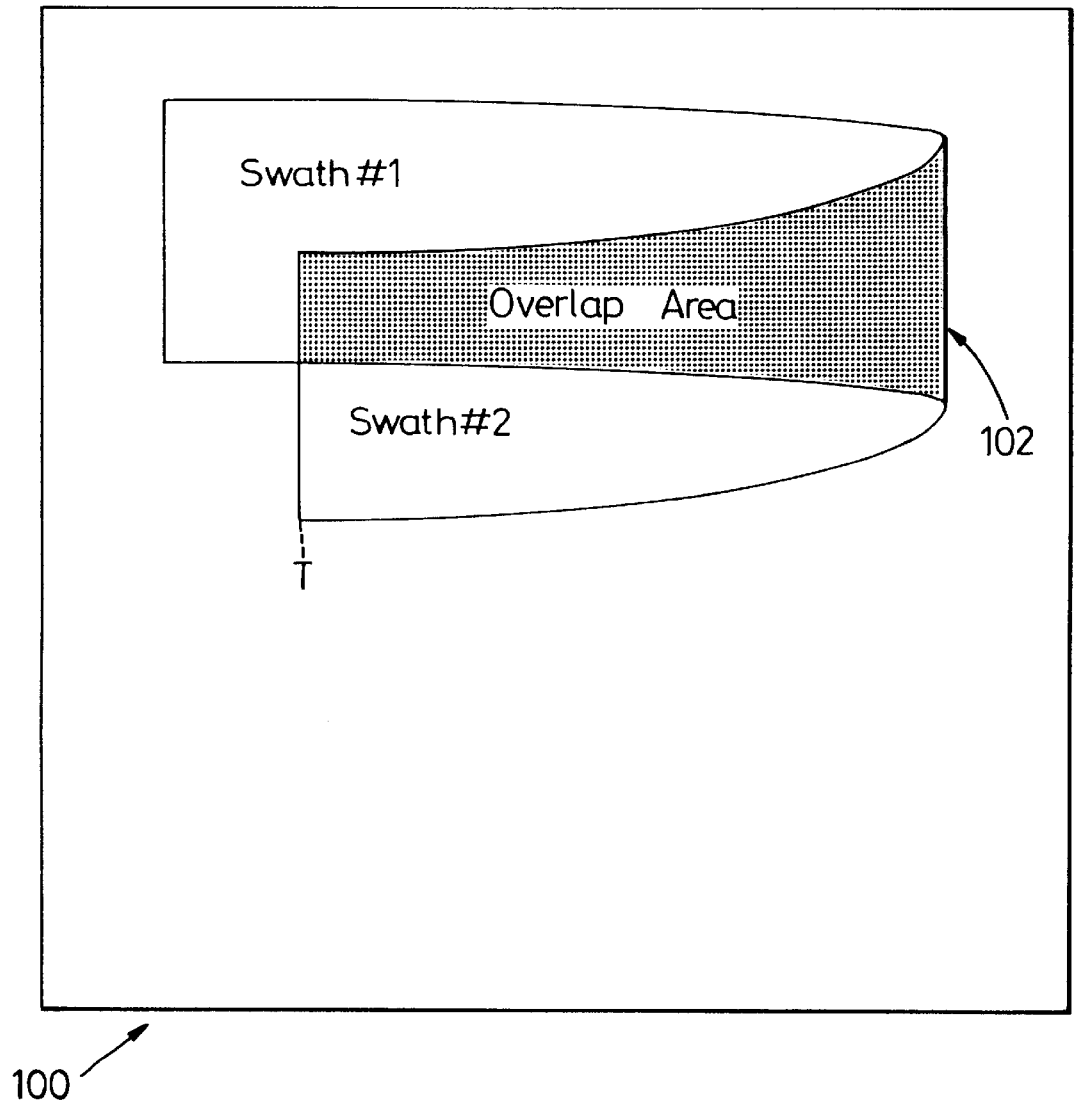
FIG. 12 is a representation of swaths being collected by the scanning device of FIG. 1.

The scan represented by the loci of endpoints of increments in FIG. 11 generates two overlapping swaths. In FIG. 12 the portion mapped into the rectilinear image buffer 100 that comprises Swath #1 is partially remapped on the return by the portion of the scan that corresponds to Swath #2, with the area of overlap 102 shown filled. At a time T, a partial swath has thus far been scanned. Satisfactory stitching can be achieved, in this case, by simply continuing to map Swath #2 to the rectilinear image buffer 100 on top of Swath #1. Returning to FIG. 11, Increment #2 can be mapped along its whole length in just the same way as for Increment #1 and similarly for each pixel in the region of overlap 102 in FIG. 12. The final rendition in the rectilinear image buffer 100 that resulted from Swath #1 is simply replaced with that resulting from Swath #2.

Equally, a scheme in which pixels in the area of overlap 102, mapped as part of Swath #1, are not replaced by those mapped by Swath #2, will also prove satisfactory provided that all pixels mapped by Swath #2 that are not part of the overlap (i.e. are not also mapped by Swath #1) are properly mapped. That is to say, the region mapped by Swath #1 is used to clip the region mapped by Swath #2. In fact, provided that Swath #1 and Swath #2 correctly map all pixels that lie outside the overlap region, then the pixels in the overlap region can be obtained equally from either Swath #1 or Swath #2, or a combination.

In practice, due to the accumulation of errors between the position tags of Swath #1 and Swath #2, this simple approach which assumes no navigation errors does not give very good results.

Figure 13:
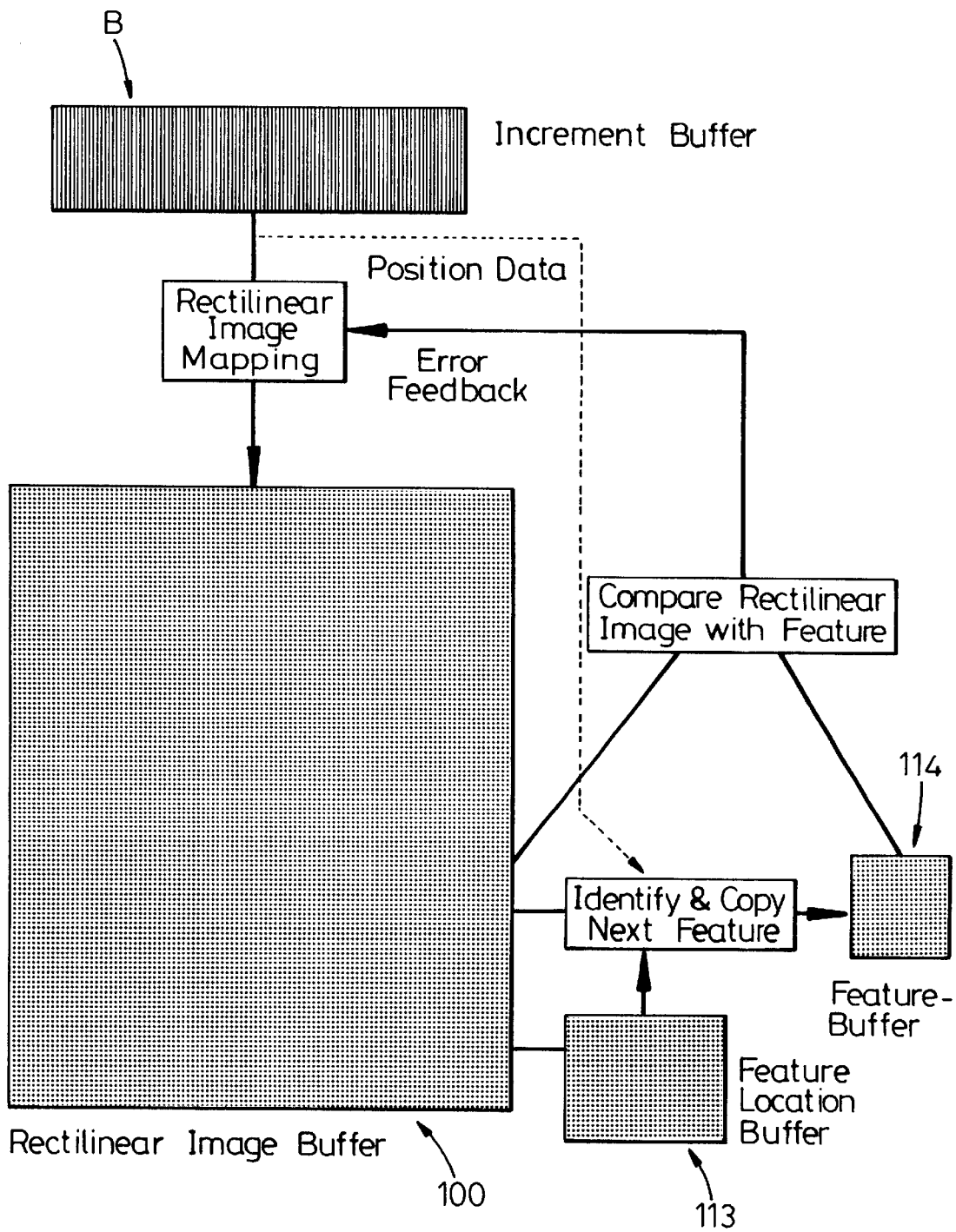
FIG. 13 shows the buffers used in a one-phase process according to the present invention.
Figure 14:
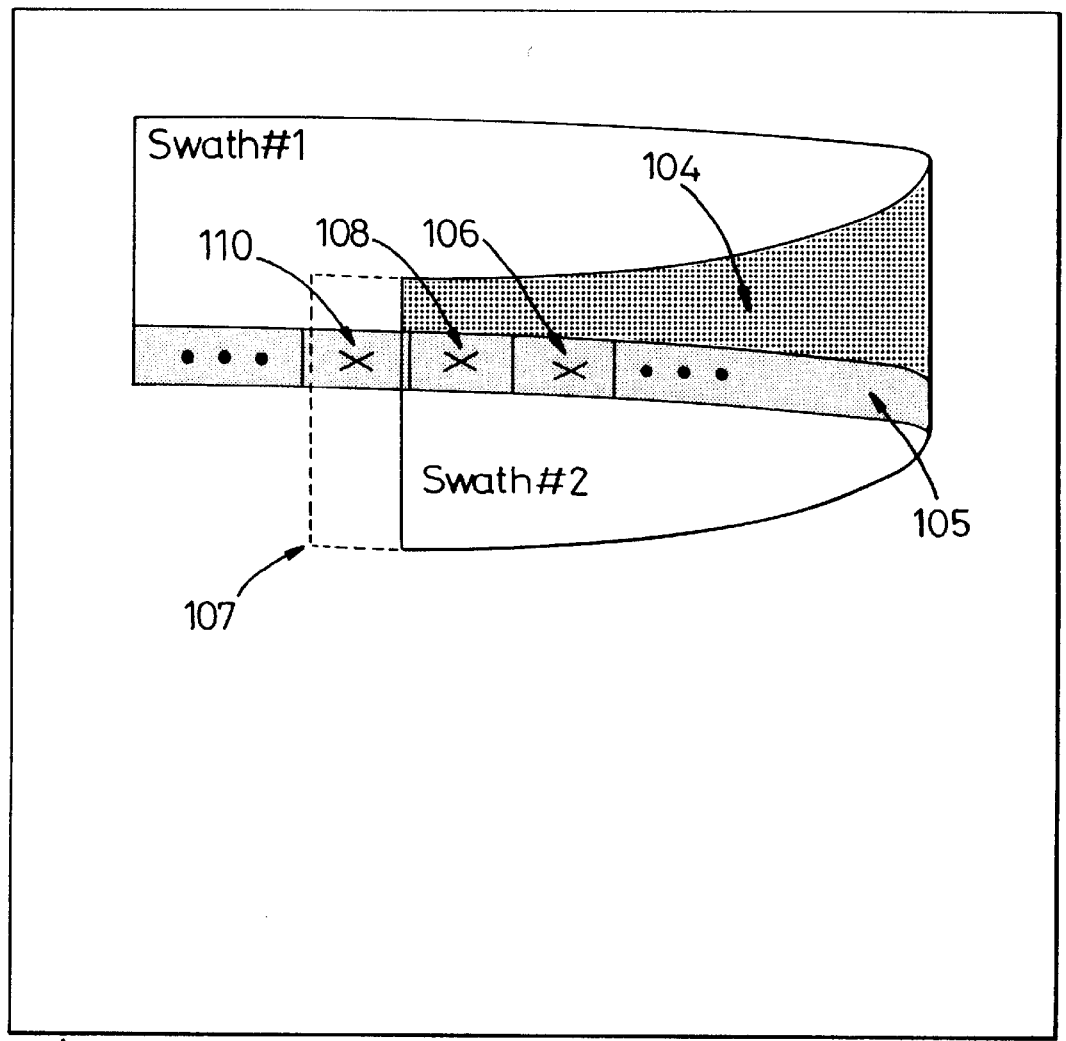
FIG. 14 illustrates swaths being collected when the one-phase process is being used.

An advantageous method of stitching will now be described with reference to FIGS. 13 and 14. FIG. 13 indicates the processing stages and data buffers involved while FIG. 14 relates to the process utilised with respect to Swath #1 and Swath #2. The image increment data in the increment buffer B is mapped to the rectilinear image buffer 100 as described previously. FIG. 14 shows part of the image captured in Swath #1 being re-mapped in the rectilinear image buffer 100 by the return pass, Swath #2. Navigation correction is calculated by correlating features within the area of overlap between Swath #1 and Swath #2.

FIG. 14 highlights this overlap area which is divided into two parts 104 and 105. As shown in FIG. 14, during collection of Swath #1, quadrilateral image segments (henceforth called "registration tiles") of which three (106, 108 and 110 are indicated) are periodically labeled along the lower edge of the swath in the overlap area 105. On a later pass (Swath #2) the overlap area 104 of Swath #2 above the area 105 containing the registration tiles 106, 108 and 110 of Swath #1 is clipped, i.e. discarded, as Swath #2 is acquired, by not permitting those pixels of Swath #1 to be overwritten. The registration tile 106 from Swath #1 is located in the top of what remains of Swath #2, after the overlap area 104 has been clipped. If the navigation data is perfect, there will be no offset between the location of registration tile 106 and the location of that tile's rescanned image in Swath #2. More realistically, some navigation error will have accumulated since the last registration was performed. The offset between the appearance of this tile in the two swaths produces a correction factor which is then used to update future navigation position-tags associated with the image data, in order to minimize the total accumulated error. In this way the total accumulated error in the navigation data is prevented from growing so large that it introduces an obvious distortion in the region where the swaths overlap.

The processing stages for stitching Swath #1 to Swath #2 will now be described with reference to FIGS. 13 and 14. FIG. 13 shows the image increment buffer B and the rectilinear image buffer 100. FIG. 13 also shows a feature location buffer 113 and a feature buffer 114. The processing stages are as follows:

1. As mentioned above, during collection of Swath #1, registration tiles (106, 108 and 110) are periodically labeled along the lower edge of the swath in the overlap area 105. An entire registration tile could be used for the correlation decribed above, but in the preferred embodiment a small area of high-frequency contrast (henceforth called a "registration feature") consisting of a rectangular tile (e.g., 15×15 pixels) of grey scale image is located within a registration tile forming part of the image being reconstructed in the rectilinear image buffer 100 as a result of the capture of Swath #1.

2. The position tags of the registration features (which define the position of each registration feature within the rectilinear image buffer 100) are saved in the feature location buffer 113 prior to the start of the mapping of Swath #2 into the rectilinear image buffer 100.

3. As Swath #2 is mapped, registration feature locations are identified in advance of being overwritten in the rectilinear image buffer 100 by Swath #2. This is achieved by defining a rectangular capture window 107, indicated in FIG. 14 with a length equal to an image increment and a width of a few pixels, which precedes the image increment of Swath #2 which is currently undergoing mapping into the rectilinear image buffer 100. When a registration feature location stored in the feature location buffer 113 falls within the capture window 107, the registration feature location is selected (only one registration feature location may be selected at any one time).

4. The result of selecting a registration feature location is to copy the relevant registration feature (ie. the registration feature located at that location in the rectilinear image buffer 100) to the feature buffer 114. The feature buffer 114 temporarily stores a copy of the registration feature together with its position tag.

5. After Swath #2 has been mapped into the rectilinear image buffer 100 so as to overwrite the location (and a small neighbouring area) of the registration feature, a copy of which is stored in the feature buffer 114, the contents of the feature buffer 114 and the newly written part of the rectilinear image buffer 100 are compared to produce a navigation correction signal, i.e. the translation required to bring the two image fragments into close correspondence.

6. This correction signal is fed back to the navigation processor 80 shown in FIG. 9. In order to prevent obvious distortions in the final representative image, the error estimate is applied gradually i.e. the "position-tags" are modified in small fixed magnitude steps as each new row of linear sensor data is loaded into memory, until there has been an accounting for the entire error.

While other correlation approaches could be employed, an acceptable approach for calculation of the offset between two image fragments is a "sum of squared difference" correlation. A small search area is defined around the original location of the feature and correlation coefficients are determined by equation:

$$C_{k,1} = \Sigma_i \Sigma_j (T_{ij} - I_{i+k,j+1})^2$$

where $T_{ij}$ denotes the grey scale values of the feature from Swath #1 and $I_{i+k,j+1}$ denotes the greyscale values of the newly acquired feature from Swath #2. Indices i and j specify pixel locations within the features, while k and 1 specify the magnitude of the proposed translational offset (constrained to remain within the search space). The smallest element in the resulting correlation array denotes the offset between the two features.

Figure 15:
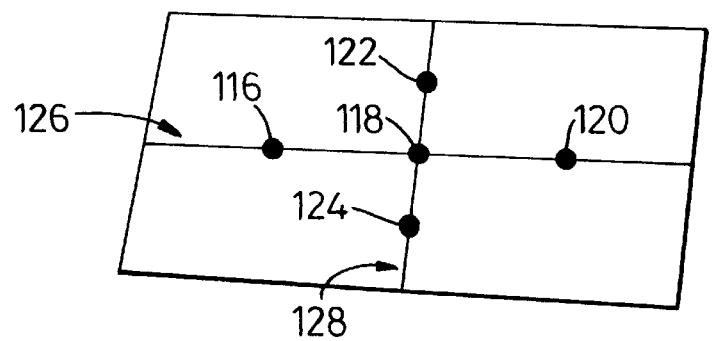
FIG. 15 is a representation of a registration tile that may be utilized to achieve stitching of successive swaths.

The registration feature within the registration tile is selected to maximize image variance, since this improves the accuracy of the correlation method. In one possible embodiment, only a subset of locations within the region is considered. These locations 116, 118, 120, 122 and 124 are shown in FIG. 15 as lying along the principal axes 126 and 128 of the registration tile (lines joining opposite midpoints of lines that define the region) and are sampled at the intersection and halfway between the intersection and each endpoint of the axis. For each location 116, 118, 120, 122 and 124, the variance $VAR_{k,1}$ is calculated using the equations:

$$SUM_{k,1} = \Sigma_i \Sigma_j I_{k+i, 1+j}$$

$$SUM2_{k,1} = \Sigma_i \Sigma_j (I_{k+i, 1+j})^2$$

$$VAR_{k,1} = SUM2_{k,1}/N - (SUM_{k,1})^2/N^2$$

If navigation errors are relatively large, the above described method can still introduce unwanted artefacts into the reconstructed image, particularly at the beginning of swaths. This is because the error between the calculated positions of the top and bottom of the image increments accumulates along the length of a swath and is at a maximum at the start of a new swath.

Another, preferred, embodiment of the stitching method will now be briefly described with reference to FIG. 16 and 17.

Figure 16:
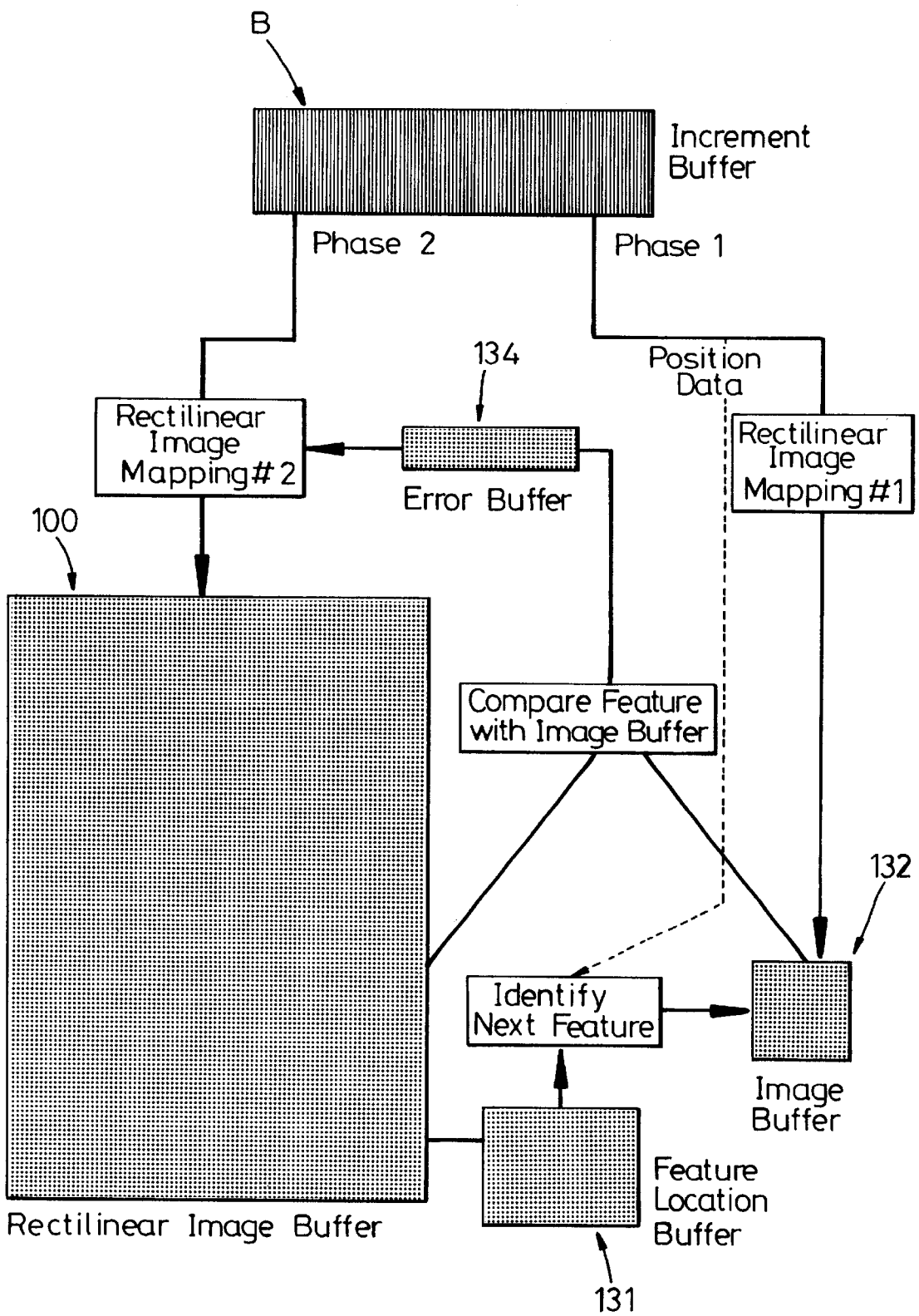
FIG. 16 shows the buffers used in a two-phase process for achieving stitching of successive swaths.
Figure 17:
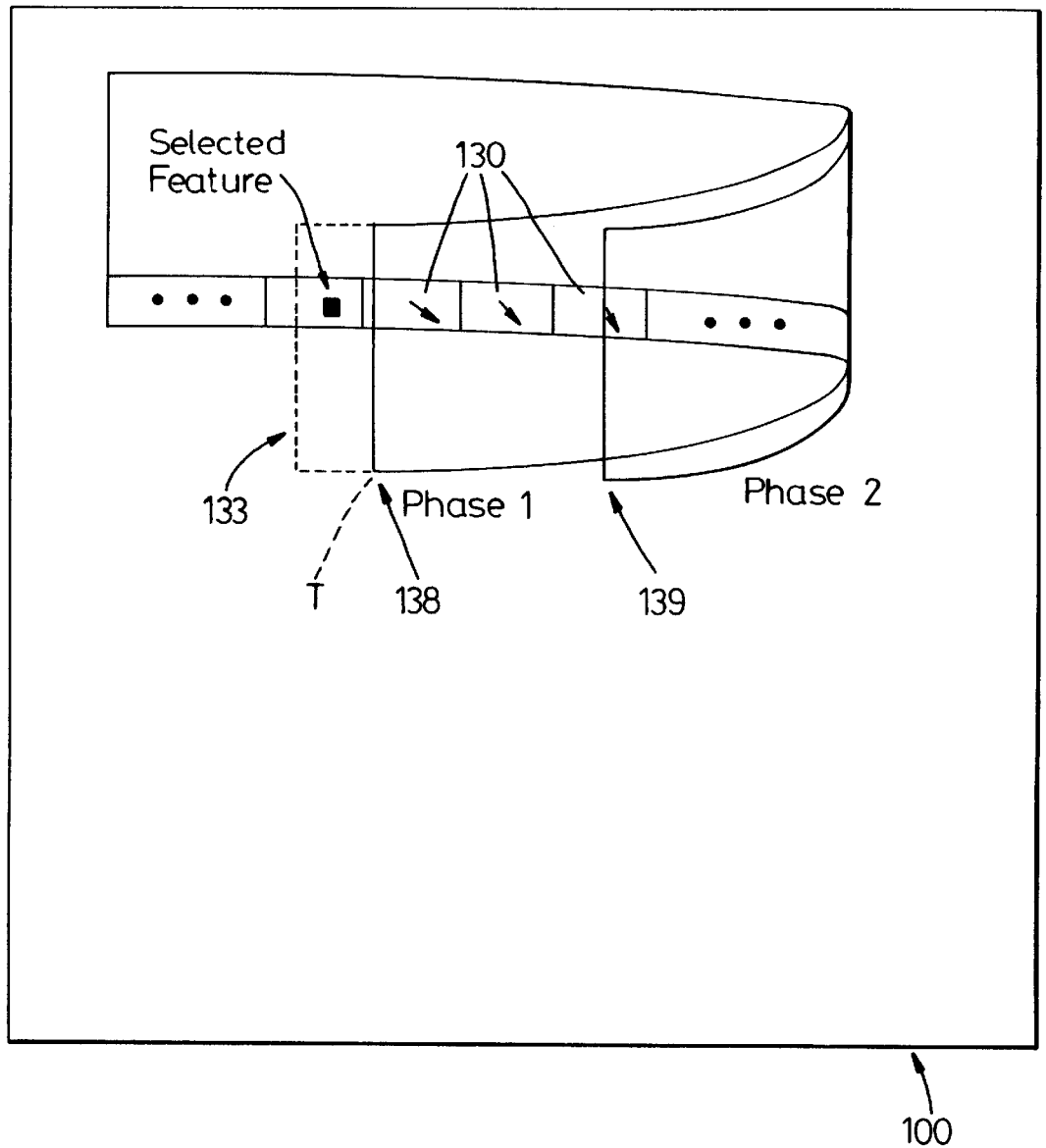
FIG. 17 illustrates swaths being collected when the two-phase process of FIG. 16 is being used.

FIG. 16 shows the image increment buffer B and the rectilinear image buffer 100. As in the embodiment described with respect to FIGS. 13, 14 and 15, a feature location buffer 131 is used to store position tags for registration features identified in Swath #1. There is also a special image buffer 132 for storing image fragments from the buffer B as will be described.

FIG. 17 again shows part of the image captured in Swath #1 being remapped by the return pass, Swath #2. Registration tiles are indicated at 130. However, in this embodiment there are two processing phases for stitching Swath #2 to Swath #1. The processing stages in the first processing phase differ from those of the FIG. 13 process in that after step 3:

The selected registration feature location is used to define the predicted location of the registration feature when Swath #2 is mapped into the rectilinear image buffer 100. Navigation errors found with respect to previous registration features are taken account of by using the current error estimate (stored in an error buffer 134) to predict the location of the current registration feature. Hence, the search area used to locate the current registration feature then need only be large enough to account for the possible error increment. The special image buffer 132 is used temporarily to store, directly from buffer B, a rectinlinear image mapping of the image data of Swath #2 located around the selected registration feature location as well as storing the registration feature location. In other words, at time T, the image increment 138 shown in FIG. 17 is mapped into the buffer 132. The size of the special image buffer 132 must be adequate to store the registration feature plus the required search area, the size of which is calculated according to known error estimation algorithms. The image fragment from Swath #2 stored in the special image buffer 132 is then compared with the corresponding image fragment stored at the registration feature location in the rectilinear image buffer 100. In this way, an offset is obtained which, when accumulated with the previous error estimate, gives an updated estimate of navigation error. This updated estimate is stored in the error buffer 134 along with a position tag.

The position tag of the error estimate is simply the location, with respect to the rectilinear image buffer 100, of the centre of the current registration feature. It is used in turn to determine the increment in the increment buffer B to which the error estimate relates (i.e. the first increment corresponding to Swath #2 which maps to that image location). This indicates the increment by which the measured estimate should be fully accommodated.

In a second processing phase, the image data from Swath #2 is written into the rectilinear image buffer 100 taking account of the error estimates at the recorded positions so as to remove those errors from the final reconstructed image. This is done by modifying the position data associated with the endpoints of the individual image increments of sensor data.

This preferred approach gives improved stitching because errors in the positions of the navigation sensor travelling through the overlap region between swaths are identified and corrected for before the final image is reconstructed. In addition, error between the calculated positions of the top and bottom of the image increments which has accumulated during collection of the previous swath can be absorbed at once at the beginning of the next swath without introducing unwanted artefacts. This is indicated in FIG. 17 by the discontinuity between the right hand edges of the turning point between Swath #1 and Swath #2 derived from the first and second processing phases described above.

The stitching processes described above may be implemented in different ways with regard to the nature of scanning required. One alternative is to require scanning to be carried out from the top of a page to the bottom, in which case stitching need only ever be done between the bottom of one swath and the top of the next. Another approach is to allow scanning to start at any part of the page but to require the initial direction of scanning to be maintained. In that case, there must be the capability to identify registration features on both edges of swaths, but once the direction of scanning is established, error estimates need only be kept for one side of the current swath. In another approach, scanning may be permitted in any direction and changes in scanning direction can also be accommodated eg. a spiral scan. In this third approach, not only must there be the capability to identify registration features on both edges of swaths, but error estimates must be kept for both the top and bottom of each swath in case the direction of scanning should change. The latter approach gives the greatest flexibility for the user but has a higher computing overhead.

In a preferred embodiment of a device according to the invention, the processing electronics for image reconstruction, stitching and image management is contained within the housing that defines the scanning device 10 of FIG. 1. Thus, the scanned image may be immediately presented at the image display 16. However, the scanning device may contain memory to store the position-tagged image data, but without processing and file management electronics and firmware.

As noted in reference to FIG. 3, the navigation and imaging sensors 22, 24 and 26 are preferably mounted on a pivoting member 20. In one embodiment, the pivoting member is connected to the remainder of the housing by at least one elastomer for which one end of the elastomer is connected to the stationary portion of the housing and the other end is connected to the pivoting member. The elastomer acts as a hinge. Thus, the pivoting portion is allowed to "float" without the use of frictional elements. Power, control and data signals may be conducted to the sensors via flex cables that are shielded in order to minimize electromagnetic interference. Other methods of pivotally attaching the pivoting member can be used. If the pivoting member is deleted and the sensors are in a fixed position on the housing, care must be taken no to tilt the scanning device 10 excessively during image capture. In this embodiment, the design of illumination and optical elements must be given increased attention.

While the invention has been described and illustrated as one in which a planar original is scanned, this is not critical. In fact, persons skilled in the art will readily understand how many of the techniques may be used for scanning three-dimensional images. However, the preferred embodiment is one in which the image of interest is formed on a medium, such as a piece of paper, a transparency, or a photograph, and the scanning device is in contact with the medium.

What is claimed is:

1. A method of reconstructing an image captured as image data in a sensor and position data in a navigation means, comprising:
    defining a pixel grid for a reconstructed image;
    using position data to identify correspondence between sensor data and the pixel data and thereby to identify in the pixel grid active pixels; and
    determining the intensity of active pixels in the pixel grid from image data obtained at a plurality of sensor positions and selected as relevant to each active pixel, respectively, for which the intensity is to be determined.

2. A method as claimed in claim 1, wherein the image is captured in the form of a stream of successive sensor readings with position data for each sensor reading.

3. A method as claimed in claim 2, wherein the sensor is a linear sensor.

4. A method as claimed in claim 2, wherein the step of identifying correspondence between image data and the pixel grid comprises mapping of image data on to the pixel grid, whereby a region is defined in the pixel grid between the image data of boundary sensor readings after mapping of the boundary sensor readings on to the pixel grid, wherein image data of the boundary sensor readings defining said region are selectable as relevant to pixels within said region.

5. A method as claimed in claim 4, wherein the boundary sensor readings are two consecutive sensor readings in the stream.

6. A method as claimed in claim 4, wherein the boundary sensor readings are two sensor readings in the stream, and wherein image data of any sensor readings in the stream between the boundary sensor readings are also selectable as relevant to pixels within said region, the boundary sensor readings and all sensor readings between them in the stream comprising a chunk.

7. A method as claimed in claim 6, wherein the number of sensor readings in a chunk is determined by the degree of uniformity of corresponding position data.

8. A method as claimed in claim 4, wherein the step of identifying correspondence between image data and the pixel grid further comprises the step of determining which pixels in the pixel grid fall within the region defined by the selected sets of sensor data.

9. A method as claimed in claim 8, wherein pixels in the pixel grid are mapped into a space defined by the boundary sensor readings, and wherein the grid pixels for which intensity is determined are those that map within the defined space.

10. A method as claimed in claim 9, wherein the space defined by the boundary sensor readings is defined so as to provide uniform sampling in sensor readings.

11. A method as claimed in claim 9, where the intensity of a grid pixel is determined by interpolation from sensor pixel values in each of two successive sensor readings, wherein the sensor pixel values are selected to span the grid pixel mapped into the space.

12. A method as claimed in claim 11, wherein said interpolation is a bilinear interpolation from two sensor pixel values in each of two successive sensor readings.

13. A method as claimed in claim 11, wherein for each of the two successive sensor readings, an interpolated pixel value is calculated from sensor pixel values at an interpolated pixel position, and wherein the grid pixel value is calculated from the interpolated pixel values.

14. A method as claimed in claim 13, wherein the interpolated pixel values are calculated by linear interpolation.

15. A method as claimed in claim 13, wherein the grid pixel value is calculated from the interpolated pixel values by linear interpolation.

16. A method as claimed in claim 13, wherein the interpolated pixel positions are located at intersections between a grid pixel row containing the grid pixel and the positions of the two successive sensor readings.

17. A method as claimed in claim 1, wherein the pixel grid is rectilinear.

18. A method as claimed in claim 1, wherein the navigation means comprises one or more sensors for detecting inherent structure-related properties of a medium carrying the image captured.

19. A method as claimed in claim 1, wherein the sensor is comprised in a scanning device.

20. A scanning device having a sensor for capturing image data and a navigation element for capturing position data, the scanning device being further adapted to define a pixel grid for a reconstructed image; use the position data to identify correspondence between sensor data and the pixel grid and thereby to identify in the pixel grid active pixels; and to determine the intensity of active pixels in the pixel grid from image data obtained at a plurality of sensor positions and selected as relevant to each active pixel, respectively, for which the intensity is to be determined.

21. A scanning system, comprising a scanning device, having a sensor for capturing image data and a navigation element for capturing position data, and a computational device adapted to receive image data and position data from the scanning device, the computational device being further adapted to define a pixel grid for a reconstructed image; use the position data to identify correspondence between sensor data and the pixel grid and thereby to identify in the pixel grid active pixels; and to determine the intensity of active pixels in the pixel grid from image data obtained at a plurality of sensor positions and selected as relevant to each active pixel, respectively, for which the intensity is to be determined.

* * * * *